United States Patent
Phillips et al.

(10) Patent No.: US 8,258,961 B2
(45) Date of Patent: *Sep. 4, 2012

(54) RFID READER ENCLOSURE AND MAN-O-WAR RFID READER SYSTEM

(75) Inventors: Travis A. Phillips, Madison, WI (US); Kenneth Andrew Tinnell, Loveland, OH (US); Adam Salvo, Oregon, WI (US); Robert Joseph Doeden, Sun Prairie, WI (US)

(73) Assignee: Promega Corporation, Madison, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/226,870

(22) Filed: Sep. 7, 2011

(65) Prior Publication Data

US 2011/0315766 A1 Dec. 29, 2011

Related U.S. Application Data

(63) Continuation of application No. 12/759,510, filed on Apr. 13, 2010, now Pat. No. 8,031,072, which is a continuation of application No. 11/687,272, filed on Mar. 16, 2007, now Pat. No. 7,710,275.

(51) Int. Cl.
*G08B 13/14* (2006.01)
(52) U.S. Cl. ............... 340/572.8; 700/225; 235/385
(58) Field of Classification Search .......... 340/572.8, 340/572.1, 572.4, 572.7; 235/385; 700/225
See application file for complete search history.

(56) References Cited

U.S. PATENT DOCUMENTS

| | | | |
|---|---|---|---|
| 3,827,053 A | 7/1974 | Willie et al. |
| 3,861,433 A | 1/1975 | Schier et al. |
| 3,918,671 A | 11/1975 | Mizusawa |
| 4,116,512 A | 9/1978 | Wiser |
| 4,118,693 A | 10/1978 | Norikoff |
| 4,223,830 A | 9/1980 | Walton |
| 4,227,037 A | 10/1980 | Layton |
| 4,354,613 A | 10/1982 | Desai et al. |
| 4,414,690 A | 11/1983 | Nordholt et al. |
| 4,496,406 A | 1/1985 | Dedow |
| 4,580,041 A | 4/1986 | Walton |
| 4,616,694 A | 10/1986 | Hsieh |
| 4,636,634 A | 1/1987 | Harper et al. |
| 4,636,950 A | 1/1987 | Caswell et al. |
| 4,639,875 A | 1/1987 | Abraham et al. |
| 4,656,463 A | 4/1987 | Anders et al. |

(Continued)

FOREIGN PATENT DOCUMENTS

AU 2002211769 3/2007

(Continued)

OTHER PUBLICATIONS

United States Patent Office Action for U.S. Appl. No. 13/101,746 dated Dec. 15, 2011 (8 pages).

(Continued)

*Primary Examiner* — John A Tweel, Jr.
(74) *Attorney, Agent, or Firm* — Michael Best & Friedrich LLP

(57) ABSTRACT

An apparatus including an enclosure for an RFID reader to be affixed to a storage container; an RFID reader that scans a first storage container using a first antenna and a second storage container using a second antenna; and a networked system of RFID apparatuses including a primary RFID apparatus and secondary RFID apparatuses that are controlled by the primary RFID apparatus.

20 Claims, 14 Drawing Sheets

U.S. PATENT DOCUMENTS

| | | | |
|---|---|---|---|
| 4,688,026 A | 8/1987 | Scribner et al. |
| 4,694,283 A | 9/1987 | Reeb |
| 4,746,830 A | 5/1988 | Holland |
| 4,785,969 A | 11/1988 | McLaughlin |
| 4,805,207 A | 2/1989 | McNutt et al. |
| 4,837,568 A | 6/1989 | Snaper |
| 4,847,764 A | 7/1989 | Halvorson |
| 4,860,918 A | 8/1989 | Wuyten et al. |
| 4,862,160 A | 8/1989 | Ekchian et al. |
| 4,866,661 A | 9/1989 | de Prins |
| 4,881,061 A | 11/1989 | Chambers |
| 4,961,533 A | 10/1990 | Teller et al. |
| 5,008,814 A | 4/1991 | Mathur |
| 5,014,875 A | 5/1991 | McLaughlin et al. |
| 5,019,815 A | 5/1991 | Lemelson et al. |
| 5,021,800 A | 6/1991 | Rilling |
| 5,030,807 A | 7/1991 | Landt et al. |
| 5,036,308 A | 7/1991 | Fockens |
| 5,038,023 A | 8/1991 | Saliga |
| 5,091,713 A | 2/1992 | Horne et al. |
| 5,099,226 A | 3/1992 | Andrews |
| 5,103,222 A | 4/1992 | Hogen Esch et al. |
| 5,117,407 A | 5/1992 | Vogel |
| 5,144,314 A | 9/1992 | Malmberg et al. |
| 5,155,847 A | 10/1992 | Kirouac et al. |
| 5,194,856 A | 3/1993 | Zijlstra |
| 5,208,599 A | 5/1993 | Rudduck et al. |
| 5,214,409 A | 5/1993 | Beigel |
| 5,231,844 A | 8/1993 | Park |
| 5,240,139 A | 8/1993 | Chirnomas |
| 5,260,690 A | 11/1993 | Mann et al. |
| 5,266,925 A | 11/1993 | Vercellotti et al. |
| 5,285,041 A | 2/1994 | Wright |
| 5,287,414 A | 2/1994 | Foster |
| 5,294,931 A | 3/1994 | Meier |
| 5,327,118 A | 7/1994 | Drucker et al. |
| 5,335,509 A | 8/1994 | Namisniak et al. |
| 5,365,551 A | 11/1994 | Snodgrass et al. |
| 5,389,919 A | 2/1995 | Warren et al. |
| 5,392,025 A | 2/1995 | Figh et al. |
| 5,408,443 A | 4/1995 | Weinberger |
| 5,410,315 A | 4/1995 | Huber |
| 5,421,009 A | 5/1995 | Platt |
| 5,424,858 A | 6/1995 | Gillotte |
| 5,431,299 A | 7/1995 | Brewer et al. |
| 5,446,447 A | 8/1995 | Carney et al. |
| 5,450,070 A | 9/1995 | Massar et al. |
| 5,460,294 A | 10/1995 | Williams |
| 5,471,203 A | 11/1995 | Sasaki et al. |
| 5,478,990 A | 12/1995 | Montanari et al. |
| 5,487,276 A | 1/1996 | Namisniak et al. |
| 5,487,764 A | 1/1996 | Ford, Jr. |
| 5,489,908 A | 2/1996 | Orthmann et al. |
| 5,491,715 A | 2/1996 | Flaxl |
| 5,495,961 A | 3/1996 | Maestre |
| 5,500,650 A | 3/1996 | Snodgrass et al. |
| 5,519,381 A | 5/1996 | Marsh et al. |
| 5,520,450 A | 5/1996 | Colson, Jr. et al. |
| 5,521,601 A | 5/1996 | Kandlur et al. |
| 5,528,222 A | 6/1996 | Moskowitz et al. |
| 5,528,232 A | 6/1996 | Verma et al. |
| 5,530,702 A | 6/1996 | Palmer et al. |
| 5,537,105 A | 7/1996 | Marsh et al. |
| 5,539,394 A | 7/1996 | Cato et al. |
| 5,541,604 A | 7/1996 | Meier |
| 5,550,547 A | 8/1996 | Chan et al. |
| 5,557,280 A | 9/1996 | Marsh et al. |
| 5,564,803 A | 10/1996 | McDonald et al. |
| 5,565,858 A | 10/1996 | Guthrie |
| 5,573,082 A | 11/1996 | Conlan et al. |
| 5,583,819 A | 12/1996 | Roesner et al. |
| 5,600,121 A | 2/1997 | Kahn et al. |
| 5,602,538 A | 2/1997 | Orthmann et al. |
| 5,606,902 A | 3/1997 | Hosono et al. |
| 5,608,298 A | 3/1997 | Frolov et al. |
| 5,608,739 A | 3/1997 | Snodgrass et al. |
| 5,621,199 A | 4/1997 | Calari et al. |
| 5,627,517 A | 5/1997 | Theimer et al. |
| 5,627,544 A | 5/1997 | Snodgrass et al. |
| 5,629,981 A | 5/1997 | Nerlikar |
| 5,648,765 A | 7/1997 | Cresap et al. |
| 5,648,767 A | 7/1997 | O'Connor et al. |
| 5,680,459 A | 10/1997 | Hook et al. |
| 5,686,902 A | 11/1997 | Reis et al. |
| 5,689,238 A | 11/1997 | Cannon, Jr. et al. |
| 5,699,066 A | 12/1997 | Marsh et al. |
| 5,701,252 A | 12/1997 | Facchin et al. |
| 5,703,347 A | 12/1997 | Reddersen et al. |
| 5,708,423 A | 1/1998 | Ghaffari et al. |
| 5,711,160 A | 1/1998 | Namisniak et al. |
| 5,713,485 A | 2/1998 | Liff et al. |
| RE35,743 E | 3/1998 | Pearson |
| 5,726,630 A | 3/1998 | Marsh et al. |
| 5,739,765 A | 4/1998 | Stanfield et al. |
| 5,742,618 A | 4/1998 | Lowe |
| 5,745,036 A | 4/1998 | Clare |
| 5,745,366 A | 4/1998 | Higham et al. |
| 5,751,221 A | 5/1998 | Stanfield et al. |
| 5,764,992 A | 6/1998 | Kullick et al. |
| 5,765,707 A | 6/1998 | Kenevan |
| 5,771,003 A | 6/1998 | Seymour |
| 5,774,053 A | 6/1998 | Porter |
| 5,774,059 A | 6/1998 | Henry et al. |
| 5,774,876 A | 6/1998 | Woolley et al. |
| 5,777,561 A | 7/1998 | Chieu et al. |
| 5,786,763 A | 7/1998 | Canipe |
| 5,787,174 A | 7/1998 | Tuttle |
| H1743 H | 8/1998 | Graves et al. |
| 5,797,515 A | 8/1998 | Liff et al. |
| 5,798,693 A | 8/1998 | Engellenner |
| 5,798,694 A | 8/1998 | Reber et al. |
| 5,801,628 A | 9/1998 | Maloney |
| 5,805,455 A | 9/1998 | Lipps |
| 5,805,456 A | 9/1998 | Higham et al. |
| 5,805,897 A | 9/1998 | Glowny |
| 5,809,230 A | 9/1998 | Pereira |
| 5,818,348 A | 10/1998 | Walczak et al. |
| 5,822,692 A | 10/1998 | Krishan et al. |
| 5,822,714 A | 10/1998 | Cato |
| 5,825,806 A | 10/1998 | Tuttle |
| 5,831,531 A | 11/1998 | Tuttle |
| 5,836,618 A | 11/1998 | Perlman |
| 5,841,770 A | 11/1998 | Snodgrass et al. |
| 5,842,118 A | 11/1998 | Wood, Jr. |
| 5,842,976 A | 12/1998 | Williamson |
| 5,852,911 A | 12/1998 | Yuyama et al. |
| 5,857,152 A | 1/1999 | Everett |
| 5,883,582 A | 3/1999 | Bowers et al. |
| 5,886,634 A | 3/1999 | Muhme |
| 5,887,176 A | 3/1999 | Griffith et al. |
| 5,889,474 A | 3/1999 | La Due |
| 5,892,441 A | 4/1999 | Woolley et al. |
| 5,894,266 A | 4/1999 | Wood, Jr. et al. |
| 5,902,984 A | 5/1999 | Planke |
| 5,902,991 A | 5/1999 | Kumar |
| 5,905,653 A | 5/1999 | Higham et al. |
| 5,906,228 A | 5/1999 | Keller |
| 5,909,581 A | 6/1999 | Park |
| 5,910,776 A | 6/1999 | Black |
| 5,912,818 A | 6/1999 | McGrady et al. |
| 5,923,001 A | 7/1999 | Morris et al. |
| 5,923,300 A | 7/1999 | Mejia |
| 5,927,540 A | 7/1999 | Godlewski |
| 5,929,779 A | 7/1999 | MacLellan et al. |
| 5,929,801 A | 7/1999 | Aslanidis et al. |
| 5,930,145 A | 7/1999 | Yuyama et al. |
| 5,930,766 A | 7/1999 | Gibb |
| 5,936,527 A | 8/1999 | Isaacman et al. |
| 5,949,335 A | 9/1999 | Maynard |
| 5,950,630 A | 9/1999 | Portwood et al. |
| 5,955,298 A | 9/1999 | Thomashow et al. |
| 5,955,950 A | 9/1999 | Gallagher, III et al. |
| 5,955,951 A | 9/1999 | Wischerop et al. |
| 5,959,531 A | 9/1999 | Gallagher, III et al. |
| 5,959,568 A | 9/1999 | Woolley |
| 5,959,606 A | 9/1999 | Goodman et al. |
| 5,960,048 A | 9/1999 | Haartsen |

| | | |
|---|---|---|
| 5,963,134 A | 10/1999 | Bowers et al. |
| 5,963,144 A | 10/1999 | Kruest |
| 5,969,606 A | 10/1999 | Reber et al. |
| 5,971,277 A | 10/1999 | Cragun et al. |
| 5,974,454 A | 10/1999 | Apfel et al. |
| 5,977,875 A | 11/1999 | Lin et al. |
| 5,979,941 A | 11/1999 | Mosher, Jr. et al. |
| 5,986,570 A | 11/1999 | Black et al. |
| 5,990,794 A | 11/1999 | Alicot et al. |
| 5,993,046 A | 11/1999 | McGrady et al. |
| 5,995,019 A | 11/1999 | Chieu et al. |
| 5,995,898 A | 11/1999 | Tuttle |
| 5,999,091 A | 12/1999 | Wortham |
| 5,999,741 A | 12/1999 | May et al. |
| 5,999,808 A | 12/1999 | LaDue |
| 6,002,344 A | 12/1999 | Bandy et al. |
| 6,003,006 A | 12/1999 | Colella et al. |
| 6,006,034 A | 12/1999 | Heath et al. |
| 6,009,274 A | 12/1999 | Fletcher et al. |
| 6,011,243 A | 1/2000 | Arnold et al. |
| 6,011,999 A | 1/2000 | Holmes |
| 6,012,041 A | 1/2000 | Brewer et al. |
| 6,020,856 A | 2/2000 | Alicot et al. |
| 6,021,392 A | 2/2000 | Lester et al. |
| 6,023,610 A | 2/2000 | Wood, Jr. |
| 6,025,780 A | 2/2000 | Bowers et al. |
| 6,031,459 A | 2/2000 | Lake |
| 6,034,603 A | 3/2000 | Steeves |
| 6,036,099 A | 3/2000 | Leighton |
| 6,037,879 A | 3/2000 | Tuttle |
| 6,039,467 A | 3/2000 | Holmes |
| 6,040,773 A | 3/2000 | Vega et al. |
| 6,044,461 A | 3/2000 | Agha et al. |
| 6,056,199 A | 5/2000 | Wiklof et al. |
| 6,057,756 A | 5/2000 | Engellenner |
| 6,068,156 A | 5/2000 | Liff et al. |
| 6,069,564 A | 5/2000 | Hatano et al. |
| 6,070,012 A | 5/2000 | Eitner et al. |
| 6,070,070 A | 5/2000 | LaDue |
| 6,075,441 A | 6/2000 | Maloney |
| 6,088,431 A | 7/2000 | LaDue |
| 6,097,306 A | 8/2000 | Leon et al. |
| 6,107,917 A | 8/2000 | Carrender et al. |
| 6,108,588 A | 8/2000 | McGrady et al. |
| 6,112,152 A | 8/2000 | Tuttle |
| 6,112,502 A | 9/2000 | Frederick et al. |
| 6,116,461 A | 9/2000 | Broadfield et al. |
| 6,121,583 A | 9/2000 | Hansen |
| 6,121,880 A | 9/2000 | Scott et al. |
| 6,127,928 A | 10/2000 | Issacman et al. |
| 6,127,981 A | 10/2000 | Pritchett et al. |
| 6,131,399 A | 10/2000 | Hall |
| 6,131,812 A | 10/2000 | Schneider |
| 6,133,835 A | 10/2000 | De Leeuw et al. |
| 6,144,848 A | 11/2000 | Walsh et al. |
| 6,144,859 A | 11/2000 | LaDue |
| 6,147,601 A | 11/2000 | Sandelman et al. |
| 6,147,655 A | 11/2000 | Roesner et al. |
| 6,147,662 A | 11/2000 | Grabau et al. |
| 6,151,536 A | 11/2000 | Arnold et al. |
| 6,152,364 A | 11/2000 | Schoonen et al. |
| 6,152,365 A | 11/2000 | Kolls |
| 6,154,790 A | 11/2000 | Pruett et al. |
| 6,160,477 A | 12/2000 | Sandelman et al. |
| 6,169,483 B1 | 1/2001 | Ghaffari et al. |
| 6,170,285 B1 | 1/2001 | Huffman et al. |
| 6,185,198 B1 | 2/2001 | LaDue |
| 6,202,925 B1 | 3/2001 | Machii et al. |
| 6,204,764 B1 | 3/2001 | Maloney |
| 6,211,782 B1 | 4/2001 | Sandelman et al. |
| 6,218,942 B1 | 4/2001 | Vega et al. |
| 6,223,984 B1 | 5/2001 | Renner et al. |
| 6,229,443 B1 | 5/2001 | Roesner et al. |
| 6,249,227 B1 | 6/2001 | Brady et al. |
| 6,260,049 B1 | 7/2001 | Fitzgerald et al. |
| 6,265,976 B1 | 7/2001 | Roesner |
| 6,272,394 B1 | 8/2001 | Lipps |
| 6,285,868 B1 | 9/2001 | LaDue |
| 6,294,999 B1 | 9/2001 | Yarin et al. |
| 6,296,148 B1 | 10/2001 | Myers et al. |
| 6,305,609 B1 | 10/2001 | Melzer et al. |
| 6,313,747 B2 | 11/2001 | Imaichi et al. |
| 6,327,576 B1 | 12/2001 | Ogasawara |
| 6,338,007 B1 | 1/2002 | Broadfield et al. |
| 6,339,732 B1 | 1/2002 | Phoon et al. |
| 6,351,215 B2 | 2/2002 | Rodgers et al. |
| 6,356,197 B1 | 3/2002 | Patterson et al. |
| 6,362,737 B1 | 3/2002 | Rodgers et al. |
| 6,375,780 B1 | 4/2002 | Tuttle et al. |
| 6,380,858 B1 | 4/2002 | Yarin et al. |
| 6,385,505 B1 | 5/2002 | Lipps |
| 6,392,543 B2 | 5/2002 | Maloney |
| 6,392,544 B1 | 5/2002 | Collins et al. |
| 6,393,339 B1 | 5/2002 | Yeadon |
| 6,407,665 B2 | 6/2002 | Maloney |
| 6,407,669 B1 | 6/2002 | Brown et al. |
| 6,424,260 B2 | 7/2002 | Maloney |
| 6,424,262 B2 | 7/2002 | Garber et al. |
| 6,427,913 B1 | 8/2002 | Maloney |
| 6,431,438 B1 | 8/2002 | Pires et al. |
| 6,445,297 B1 | 9/2002 | Nicholson |
| 6,451,154 B1 | 9/2002 | Grabau et al. |
| 6,462,661 B2 | 10/2002 | Pfeiffer et al. |
| 6,501,435 B1 | 12/2002 | King et al. |
| 6,512,459 B2 | 1/2003 | Benezech et al. |
| 6,512,478 B1 | 1/2003 | Chien |
| 6,517,000 B1 | 2/2003 | McAllister et al. |
| 6,522,645 B1 | 2/2003 | Lee et al. |
| 6,529,446 B1 | 3/2003 | de la Huerga |
| 6,529,466 B2 | 3/2003 | Saga et al. |
| 6,532,399 B2 | 3/2003 | Mase |
| 6,563,425 B2 | 5/2003 | Nicholson et al. |
| 6,568,596 B1 | 5/2003 | Shaw |
| 6,590,498 B2 | 7/2003 | Helms |
| 6,595,418 B1 | 7/2003 | Iganashi et al. |
| 6,600,420 B2 | 7/2003 | Goff et al. |
| 6,609,047 B1 | 8/2003 | Lipps |
| 6,639,509 B1 | 10/2003 | Martinez |
| 6,639,514 B1 | 10/2003 | Muller |
| 6,640,159 B2 | 10/2003 | Holmes et al. |
| 6,664,895 B2 | 12/2003 | Zhu |
| 6,677,852 B1 | 1/2004 | Landt |
| 6,677,857 B2 | 1/2004 | Bara et al. |
| 6,686,830 B1 | 2/2004 | Schirtzer |
| 6,687,609 B2 | 2/2004 | Hsiao et al. |
| 6,693,539 B2 | 2/2004 | Bowers et al. |
| 6,700,491 B2 | 3/2004 | Shafer |
| 6,707,381 B1 | 3/2004 | Maloney |
| 6,714,121 B1 | 3/2004 | Moore |
| 6,717,154 B2 | 4/2004 | Black et al. |
| 6,758,802 B2 | 7/2004 | Fitzgerald et al. |
| 6,760,643 B2 | 7/2004 | Lipos |
| 6,761,637 B2 | 7/2004 | Weston et al. |
| 6,768,419 B2 | 7/2004 | Garber et al. |
| 6,771,766 B1 | 8/2004 | Shafiee et al. |
| 6,793,127 B2 | 9/2004 | Alsafadi et al. |
| 6,812,824 B1 | 11/2004 | Goldinger et al. |
| 6,829,520 B1 * | 12/2004 | Green ............................ 700/225 |
| 6,830,181 B1 | 12/2004 | Bennett |
| 6,836,215 B1 | 12/2004 | Laurash et al. |
| 6,838,989 B1 | 1/2005 | Mays et al. |
| 6,839,604 B2 | 1/2005 | Godfrey et al. |
| 6,843,720 B2 | 1/2005 | Luciano et al. |
| 6,859,757 B2 | 2/2005 | Muehl et al. |
| 6,883,710 B2 | 4/2005 | Chung |
| 6,892,520 B2 | 5/2005 | Rowse et al. |
| 6,892,545 B2 | 5/2005 | Ishikawa et al. |
| 6,908,034 B2 | 6/2005 | Alleshouse |
| 6,909,326 B2 | 6/2005 | Jesme |
| 6,927,692 B1 | 8/2005 | Petrinovic |
| 6,970,141 B2 | 11/2005 | Copeland et al. |
| 6,975,834 B1 | 12/2005 | Forster |
| 6,982,640 B2 | 1/2006 | Lindsay et al. |
| 6,987,392 B1 | 1/2006 | Hernandez et al. |
| 6,989,749 B2 | 1/2006 | Mohr |
| 6,989,796 B2 | 1/2006 | Rahim |
| 7,009,515 B2 | 3/2006 | Carrender et al. |
| 7,020,680 B2 | 3/2006 | Defosse |

| | | | |
|---|---|---|---|
| 7,031,803 B2 * | 4/2006 | Eneau et al. ........................ 700/225 |
| 7,053,775 B2 | 5/2006 | Moore | |
| 7,181,501 B2 | 2/2007 | Defosse | |
| 7,250,865 B2 | 7/2007 | Maloney | |
| 7,258,276 B2 | 8/2007 | Linton et al. | |
| 7,268,742 B2 | 9/2007 | Rahim | |
| 7,293,705 B2 | 11/2007 | Linton et al. | |
| 7,315,247 B2 * | 1/2008 | Jung et al. .................... 340/572.7 |
| 7,389,916 B2 | 6/2008 | Chirnomas | |
| 7,455,225 B1 * | 11/2008 | Hadfield et al. ............... 235/435 |
| 7,591,421 B2 | 9/2009 | Linton et al. | |
| 7,661,591 B2 | 2/2010 | Dearing et al. | |
| 7,710,275 B2 * | 5/2010 | Phillips et al. ............. 340/572.8 |
| 7,735,732 B2 | 6/2010 | Linton et al. | |
| 7,784,689 B2 | 8/2010 | Linton et al. | |
| 7,791,479 B2 | 9/2010 | Dearing et al. | |
| 7,938,326 B2 | 5/2011 | Dearing et al. | |
| 7,942,321 B2 | 5/2011 | Linton et al. | |
| 8,025,228 B2 | 9/2011 | Dearing et al. | |
| 8,031,072 B2 * | 10/2011 | Phillips et al. ............. 340/572.8 |
| 2001/0000019 A1 | 3/2001 | Bowers et al. | |
| 2001/0002448 A1 | 5/2001 | Wilson et al. | |
| 2001/0011341 A1 | 8/2001 | Hayes Jr. et al. | |
| 2001/0028308 A1 | 10/2001 | De La Huerga | |
| 2001/0034259 A1 | 10/2001 | Luciano et al. | |
| 2001/0034613 A1 | 10/2001 | Rubsamen | |
| 2001/0044731 A1 | 11/2001 | Coffman et al. | |
| 2001/0044804 A1 | 11/2001 | Fitzgerald et al. | |
| 2001/0045893 A1 | 11/2001 | Swartzel et al. | |
| 2001/0045894 A1 | 11/2001 | Slavin et al. | |
| 2001/0053980 A1 | 12/2001 | Suliman, Jr. et al. | |
| 2002/0005774 A1 | 1/2002 | Rudolph et al. | |
| 2002/0011967 A1 | 1/2002 | Goff et al. | |
| 2002/0013077 A1 | 1/2002 | Lepine et al. | |
| 2002/0027507 A1 | 3/2002 | Yarin et al. | |
| 2002/0038167 A1 | 3/2002 | Chirnomas | |
| 2002/0040968 A1 | 4/2002 | Black et al. | |
| 2002/0041234 A1 | 4/2002 | Kuzma et al. | |
| 2002/0063622 A1 | 5/2002 | Armstrong et al. | |
| 2002/0113082 A1 | 8/2002 | Leatherman et al. | |
| 2002/0130778 A1 | 9/2002 | Nicholson | |
| 2002/0130788 A1 | 9/2002 | Chang | |
| 2002/0140966 A1 | 10/2002 | Meade, II et al. | |
| 2002/0143320 A1 | 10/2002 | Levin | |
| 2002/0145036 A1 | 10/2002 | Otto | |
| 2002/0145520 A1 | 10/2002 | Maloney | |
| 2002/0153411 A1 | 10/2002 | Wan et al. | |
| 2002/0167397 A1 | 11/2002 | Eroglu et al. | |
| 2002/0180588 A1 | 12/2002 | Erickson et al. | |
| 2002/0183882 A1 | 12/2002 | Dearing et al. | |
| 2002/0190871 A1 | 12/2002 | Stanfield et al. | |
| 2002/0196126 A1 | 12/2002 | Eisenberg et al. | |
| 2002/0198795 A1 | 12/2002 | Dorenbosch | |
| 2003/0006907 A1 | 1/2003 | Lovegreen et al. | |
| 2003/0030539 A1 | 2/2003 | McGarry et al. | |
| 2003/0034390 A1 | 2/2003 | Linton et al. | |
| 2003/0052783 A1 | 3/2003 | Sitzman | |
| 2003/0074106 A1 | 4/2003 | Butler | |
| 2003/0117281 A1 | 6/2003 | Sriharto et al. | |
| 2003/0171998 A1 | 9/2003 | Pujar et al. | |
| 2003/0174046 A1 | 9/2003 | Abrams | |
| 2003/0209601 A1 | 11/2003 | Chung | |
| 2003/0216969 A1 | 11/2003 | Bauer et al. | |
| 2004/0069850 A1 | 4/2004 | DeWilde | |
| 2004/0100415 A1 | 5/2004 | Veitch et al. | |
| 2004/0124988 A1 | 7/2004 | Leonard et al. | |
| 2004/0212542 A1 | 10/2004 | Rahim | |
| 2004/0222298 A1 | 11/2004 | Dearing et al. | |
| 2004/0263316 A1 | 12/2004 | Dix et al. | |
| 2005/0008376 A1 | 1/2005 | Parry et al. | |
| 2005/0009122 A1 | 1/2005 | Whelan et al. | |
| 2005/0040952 A1 | 2/2005 | Dearing et al. | |
| 2005/0088305 A1 | 4/2005 | Greene et al. | |
| 2005/0113138 A1 | 5/2005 | Mendolia et al. | |
| 2005/0125312 A1 | 6/2005 | Dearing et al. | |
| 2005/0127177 A1 | 6/2005 | Dearing et al. | |
| 2005/0247782 A1 | 11/2005 | Ambartsoumian | |
| 2006/0006999 A1 | 1/2006 | Walczyk et al. | |
| 2006/0017634 A1 | 1/2006 | Meissner | |
| 2006/0022827 A1 | 2/2006 | Higham et al. | |
| 2006/0214864 A1 | 9/2006 | Rahim | |
| 2006/0244599 A1 | 11/2006 | Taylor et al. | |
| 2006/0289650 A1 * | 12/2006 | Taylor et al. .................. 235/435 |
| 2007/0108273 A1 | 5/2007 | Harper et al. | |
| 2008/0100527 A1 | 5/2008 | Rahim | |
| 2008/0116269 A1 | 5/2008 | Dearing et al. | |
| 2008/0135613 A1 | 6/2008 | Dearing et al. | |
| 2009/0298514 A1 * | 12/2009 | Ullah ........................ 340/572.1 |

FOREIGN PATENT DOCUMENTS

| | | |
|---|---|---|
| CA | 2425189 | 5/2002 |
| CN | 1230270 | 9/1999 |
| DE | 29912346 | 12/1999 |
| EP | 0632288 | 1/1995 |
| EP | 0722590 | 7/1996 |
| EP | 0726545 | 8/1996 |
| EP | 1679636 | 7/2006 |
| EP | 1701296 | 9/2006 |
| FR | 2786876 | 6/2000 |
| GB | 2333095 | 7/1999 |
| JP | 51-122498 | 10/1976 |
| JP | 4185397 | 7/1992 |
| JP | 07-230584 | 8/1995 |
| JP | 07-302284 | 11/1995 |
| JP | 10-316210 | 12/1998 |
| JP | 11-085858 | 3/1999 |
| JP | 11-130213 | 5/1999 |
| JP | 11-283123 | 10/1999 |
| JP | 2000-038202 | 2/2000 |
| JP | 2000-137758 | 5/2000 |
| JP | 2000-251156 | 9/2000 |
| JP | 2000-276335 | 10/2000 |
| JP | 2000-310476 | 11/2000 |
| JP | 2001-052054 | 2/2001 |
| JP | 2001-097512 | 4/2001 |
| JP | 2001-160162 | 6/2001 |
| JP | 2001-229263 | 8/2001 |
| JP | 2001-240217 | 9/2001 |
| JP | 2001-317859 | 11/2001 |
| JP | 2001-317862 | 11/2001 |
| JP | 2002-032865 | 1/2002 |
| JP | 2002-056244 | 2/2002 |
| KR | 1993-0005285 | 3/1993 |
| KR | 1996-0002892 | 4/1996 |
| KR | 10-0184972 | 5/1999 |
| KR | 2001-0022226 | 3/2001 |
| KR | 2001-0022227 | 3/2001 |
| KR | 2003-0042045 | 5/2003 |
| KR | 10-0766679 | 11/2007 |
| RU | 2161329 | 12/2000 |
| RU | 2168761 | 6/2001 |
| WO | 95/25423 | 9/1995 |
| WO | WO 96/12254 | 4/1996 |
| WO | WO 97/24689 | 7/1997 |
| WO | WO 97/29729 | 8/1997 |
| WO | WO 98/26746 | 6/1998 |
| WO | WO 98/52168 | 11/1998 |
| WO | WO 99/05659 | 2/1999 |
| WO | WO 99/05660 | 2/1999 |
| WO | WO 99/12122 | 3/1999 |
| WO | WO 99/45493 | 9/1999 |
| WO | WO 99/45494 | 9/1999 |
| WO | WO 99/45495 | 9/1999 |
| WO | WO 99/46940 | 9/1999 |
| WO | WO 99/49337 | 9/1999 |
| WO | WO 99/52723 | 10/1999 |
| WO | WO 99/57837 | 11/1999 |
| WO | WO 99/60512 | 11/1999 |
| WO | WO 99/62196 | 12/1999 |
| WO | WO 99/67735 | 12/1999 |
| WO | WO 00/03352 | 1/2000 |
| WO | WO 00/04485 | 1/2000 |
| WO | WO 00/04520 | 1/2000 |
| WO | WO 00/45324 | 8/2000 |
| WO | WO 01/55931 | 8/2001 |
| WO | WO 01/94016 | 12/2001 |
| WO | WO 01/95243 | 12/2001 |
| WO | WO 02/01467 | 1/2002 |

| | | |
|---|---|---|
| WO | WO 02/03230 | 1/2002 |
| WO | WO 02/08939 | 1/2002 |
| WO | WO 02/19251 | 3/2002 |
| WO | WO 02/31629 | 4/2002 |
| WO | WO 02/33511 | 4/2002 |
| WO | WO 02/35432 | 5/2002 |
| WO | WO 03/026724 | 4/2003 |
| WO | WO 03/073201 | 9/2003 |
| WO | WO 03/073225 | 9/2003 |
| WO | WO 03/087868 | 10/2003 |
| WO | WO 2005/013496 | 2/2005 |
| WO | WO 2007/142645 | 12/2007 |
| WO | WO 2008/115784 | 9/2008 |

OTHER PUBLICATIONS

United States Patent Office Notice of Allowance for U.S. Appl. No. 13/086,575 dated Oct. 11, 2011 (4 pages).
"Mobil Speedpass makes Gasoline Purchase Virtually Effortless," Business Wire, (Feb. 17, 1997) 1-2.
"Radio Frequency Identification System—13.56 Mhz," ISO Template Version 3.0 (Feb. 7, 1997) 21 pages.
Berthon, A., Texas Instruments, "Comments on the Joint Proposal by Gemplus and Checkpoint for a Universal Wake-up Command (at 13.56 MHz)" (May 17, 2000) 1-3.
Binzoni, F. et al., "SCS Corporation Announces Radio Frequency Identification Installation at a Major Airport," www.scs-corp.com/northwest.html (Oct. 5, 1999) 1-2.
Brakkeman, L., "RFID baggage tracking solution helps keep SFIA secure," Frontline Solutions, www.scs-corp.com/frontline-SFIA%20Case%20Study.htm (Jul. 1, 2001) 1-5.
Checkpoint Systems, Inc. and Microchip Technology, Inc., "13.56Mhz Air Interface Proposal," (Aug. 11, 1999) 11 pages.
Declaration of Edward W. Burnham (May 12, 2003), 2 pages.
Gemplus NP, "Field Re-Programmable Item Management Air Interface Standard Proposal for 13,56 MHz," Gemplus 13 MHz Air Interface Proposal (Jun. 21, 1999) 1-7.
Godinez, V., "RFID tracks hospital's devices," The Dallas Morning News (Apr. 28, 2007) 3 pages.
Inferneon Technologies AG, "Multiple Frequency Anti-collision Protocol," Working Group 4—Radio Frequency Identification for Item Management (Mar. 23, 2000) 1-7.
Mobile Aspects, Inc., "Case study: expiration management—for Organization King's Daughters Medical Center," (2007) 1-2.
Mobile Aspects, Inc., "Hands free through RFID," File Aspects/Solutions/Hands Free through RFID, www.mobileaspects.com (2008) 1 page.
Mobile Aspects, Inc., "iRISite™", File Aspects/Solutions/IRISite, www.mobileaspects.com (2008) 1 page.
Mobile Aspects, Inc., "iRISMed™", File Aspects/Solutions/IRISMed, www.mobileaspects.com (2008) 1 page.
Mobile Aspects, Inc., "iRISupply™", File Aspects/Solutions/IRISupply, www.mobileaspects.com (2008) 1 page.
Mobile Aspects, Inc., "iRlSynergy™", File Aspects/Solutions/IRISynergy, www.mobileaspects.com (2008) 1 page.
Mobile Aspects, Inc., "Supporting the needs of the surgical specialty environment automating inventory management with RFID-enabled technology" (2007) 2 pages.
Moore, B., "RFID may yet prove its mettle on metal. Next-generation products try to avoid interference," Frontline Solutions (Apr. 2001) 2 pages.
Multiple Antenna Reader System (MARS), MARS-24 (2007) 2 pages.
Nalepa, D., "Inventory management and recall capabilities with RFID technology," Cath Lab Digest, (2007) 15(3):40-42.
Rosen, C., The Fast Track, Informationweek.com (Monday, Jun. 18, 2001) 1-4.
Senger, N., "Making airlines safer with RFID," Business Solutions (Mar. 2000) 1-2.
Sharp, K.R., "This 'killer app' can save lives RFID tags send selected bags to an explosive detection system at SeaTac International Airport," idSystems (Feb. 2000) 1-4.
Siedsma, A., "SCS Airms to Make Skies Friendlier for Air Travelers," The Sector (Feb. 23, 2001) 1-3.
Sorensen, S.B., "Technical Report for RFID Systems Operating in the 2.45 GHz ISM Band" (Jul. 4, 1999, revised Aug. 19, 1999) 1-51.
Universal Postal Union, "Radio Frequency Identification (RFiD) and Radio Data Capture (RDC) Systems. Air Interfaces: Communications and Interfaces: Part B: Parameter Values for 2.45 GHz Narrow Band RFiD Systems" in Technical Standard Manual (Jun. 1, 1999) 1-169.
Wigglesworth, Z., "SFO installing first-in-U.S. security system," San Jose Mercury News (Feb. 18, 2001) 1-3.
WinWare, Inc., "Winware releases the Accu-Cab RFID inventory management storage cabinet," Jun. 23, 2006, 1 page.
WinWare, Inc., CribMaster—AccuCab RFID, RFID Point of Use Dispensing "CribMaster Accu-Cab" brochure, 1 page.
Woodyard, C., "Chips to improve baggage-check efficiency," USA Today.com, Tech Reviews (Nov. 27, 2000) 1-2.
Australian Patent Office Examination Report for Application No. 2006220406 dated Nov. 28, 2008 (2 pages).
Australian Patent Examination Report for Application No. 2006252255 dated Jul. 27, 2007 (2 pages).
Australian Patent Office Examination Report for Application No. 2002211769 dated Mar. 31, 2006 (2 pages).
Australian Patent Office Examination Report for Application No. 2003217534 dated Sep. 7, 2006 (2 pages).
Canadian Patent Office Action for Application No. 2,425,189 dated Aug. 15, 2006 (5 pages).
Canadian Patent Office Action for Application No. 2,425,189 dated Mar. 5, 2009 (8 pages).
Canadian Patent Office Action for Application No. 2,425,189 dated May 11, 2010 (3 pages).
Canadian Patent Office Action for Application No. 2,425,189 dated Oct. 11, 2007 (8 pages).
Canadian Patent Office Action for Application No. 2,425,189 dated Jan. 17, 2005 (4 pages).
Canadian Patent Office Action for Application No. 2,474,183 dated Sep. 25, 2009 (3 pages).
Chinese Patent Office Action for Application No. 03804323.8 dated Dec. 12, 2008 (7 pages), translation only.
Chinese Patent Office Action for Application No. 03804323.8 dated May 22, 2009 (13 pages) with translation.
Chinese Patent Office Action for Application No. 03804323.8 dated Sep. 11, 2009 (7 pages).
Chinese Patent Office Action for Application No. 03804323.8 dated Mar. 1, 2010 (11 pages).
Chinese Patent Office Action for Application No. 03804323.8 dated Sep. 6, 2010 (12 pages).
European Patent Office Supplementary Search Report for Application No. 03713485 dated Jul. 14, 2006 (7 pages).
European Patent Office Supplementary Partial European Search Report for Application No. 03713485 dated Apr. 13, 2006 (5 pages).
European Patent Office Examination Report for Application No. 03713485 dated Feb. 7, 2008 (10 pages).
European Patent Office Action for Application No. 06023373.1 dated Sep. 13, 2007 (3 pages).
European Patent Office Communication for Application No. 01979848.7 dated Jan. 3, 2007 (4 pages).
European Patent Office Examination Report for Application No. 01979848.7 dated Nov. 23, 2004 (4 pages).
European Patent Office Search Report for Application No. 01979848.7 dated Sep. 13, 2004 (4 pages).
European Patent Office Summons to Attend Oral Proceedings for Application No. 01979848.7 dated May 12, 2010 (3 pages).
European Patent Office Decision to Refuse and Minutes for Application No. 01979848.7 dated Dec. 1, 2010 (27 pages).
Indian Patent Examination Report for Application No. 969/KOLNP/2004 dated Dec. 31, 2008 (3 pages).
International Preliminary Report on Patentability for Application No. PCT/US01/32230 dated Aug. 9, 2002 (4 pages).
International Preliminary Examination Report for Application No. PCT/US03/04653 dated May 20, 2005 (4 pages).
International Search Report for Application No. PCT/US01/32230 dated Dec. 28, 2001 (3 pages).
International Search Report for Application No. PCT/US02/40967 dated Aug. 1, 2003 (1 page).

International Search Report for Application No. PCT/US03/04653 dated Oct. 20, 2003 (3 pages).
International Search Report and Written Opinion for Application No. PCT/US2008/056981 dated Sep. 4, 2008 (9 pages).
Written Opinion for International Application No. PCT/US03/04653 dated Nov. 10, 2004 (4 pages).
Japanese Patent Office Action for Application No. 2002-538343 dated Dec. 12, 2006 (7 pages) with translation.
Japanese Patent Office Action for Application No. 2002-538343 dated Sep. 3, 2007 (2 pages) with translation.
Japanese Patent Office Action for Application No. 2007-061714, translation only (drafted Sep. 9, 2009) 4 pages).
Japanese Patent Office Action for Application No. 2003-571829 dated Jul. 9, 2008 (1 page), translation.
Japanese Patent Office Action for Application No. 2003-571829 dated Jun. 22, 2007, with translation (7 pages).
Japanese Patent Office Action for Application No. 2007-326923 dated Dec. 24, 2009 (3 pages) English translation only.
Japanese Patent Office Action for Application No. 2007-326923 dated Sep. 30, 2010 (4 pages).
Korean Patent Office Action for Application No. 45389/2007 dated Jun. 25, 2007 (5 pages) with translation.
Korean Patent Office Action for Application No. 45389/2007 dated Dec. 24, 2007 (2 pages) with translation.
Korean Patent Office Action for Application No. 45389/2007 dated Feb. 27, 2008 (5 pages) with translation.
Korean Patent Office Action for Application No. 45392/2007 dated Jun. 25, 2007 (2 pages) with translation.
Korean Patent Office Action for Application No. 45392/2007 dated Dec. 24, 2007 (2 pages) with translation.
Korean Patent Office Action for Application No. 45394/2007 dated Jun. 25, 2007 (2 pages) with translation.
Korean Patent Office Action for Application No. 45394/2007 dated Dec. 24, 2007 (2 pages) with translation.
Korean Patent Office Action for Application No. 45396/2007 dated Jun. 25, 2007 (5 pages) with translation.
Korean Patent Office Action for Application No. 45396/2007 dated Dec. 27, 2007 (2 pages) with translation.
Korean Patent Office Action for Application No. 45398/2007 dated Aug. 6, 2007 (7 pages) with translation.
Korean Patent Office Action for Application No. 45398/2007 dated Feb. 11, 2008 (3 pages) with translation.
Korean Patent Office Action for Application No. 7000578/2008 dated Apr. 18, 2008 (2 pages) with translation.
Korean Patent Office Action for Application No. 7013101/2004 dated May 18, 2007 (5 pages) with translation.
Korean Patent Office Action for Application No. 7013101/2004 dated Nov. 13, 2007 (2 pages) with translation.
Korean Patent Office Action for Application No. 7013101/2004 dated Nov. 21, 2006 (6 pages).
Korean Patent Office Action for Application No. 7027537/2006 dated Feb. 15, 2007 (8 pages) with translation.
Mexican Patent Office Action for Application No. PA/a/2004/008056 dated Aug. 8, 2008 (4 pages) translation.
Mexican Patent Office Action for Application No. PA/a/2004/008056 dated Mar. 6, 2008, translation (2 pages).
Mexican Patent Office Action for Application No. PA/a/2004/008056 dated Jul. 27, 2007 (8 pages) with translation.
Mexican Patent Office Action for Application No. Pa/a/2004/008056 dated Dec. 21, 2007 (5 pages).
Russian Decision on Grant of Russian Patent Application No. 2004128075, translation (8 pages).
Russian Patent Office Action for Application No. 2004128075 dated Jul. 3, 2006, with translation (29 pages).
Russian Patent Office Action for Application No. 2004128075/09(030475), English language translation of Office Action with a response due date of Jun. 2, 2006 (15 pages).
Russian Patent Office Action for Application No. 2008111640 with response due Oct. 2, 2009 (3 pages) translation only.
Singapore Patent Office Examination Report for Application No. 200403954-1 dated Jun. 26, 2008 (4 pages).
Singapore Patent Office Action Written Opinion for Application No. 200403954-1 dated Sep. 12, 2007 (6 pages).
Singapore Patent Office Action for Application No. 200403954-1 dated Sep. 11, 2006 (5 pages).
United States Patent Office Action for U.S. Appl. No. 10/209,348 dated Mar. 21, 2006 (9 pages).
United States Patent Office Action for U.S. Appl. No. 10/209,348 dated May 3, 2005 (9 pages).
United States Patent Office Action for U.S. Appl. No. 10/209,348 dated Oct. 15, 2004 (8 pages).
United States Patent Office Action for U.S. Appl. No. 09/981,219 dated Apr. 9, 2003 (16 pages).
United States Patent Office Action for U.S. Appl. No. 10/795,386 dated Feb. 3, 2006 (8 pages).
United States Patent Office Action for U.S. Appl. No. 10/795,386 dated Jan. 28, 2005 (7 pages).
United States Patent Office Action for U.S. Appl. No. 10/795,386 dated Jul. 14, 2005 (8 pages).
United States Patent Office Action for U.S. Appl. No. 10/795,386 dated Jul. 3, 2006 (8 pages).
United States Patent Office Action for U.S. Appl. No. 10/795,386 dated Apr. 13, 2007 (8 pages).
United States Patent Office Action for U.S. Appl. No. 10/795,386 dated Dec. 22, 2006 (7 pages).
United States Patent Office Action for U.S. Appl. No. 10/862,456 dated Dec. 10, 2008 (8 pages).
United States Patent Office Action for U.S. Appl. No. 10/862,456 dated Jan. 22, 2008 (6 pages).
United States Patent Office Action for U.S. Appl. No. 10/862,456 dated Jul. 2, 2008 (8 pages).
United States Patent Office Action for U.S. Appl. No. 10/862,456 dated Jun. 10, 2009 (7 pages).
United States Patent Office Action for U.S. Appl. No. 10/862,456 dated Jun. 8, 2006 (11 pages).
United States Patent Office Action for U.S. Appl. No. 10/862,456 dated Mar. 14, 2007 (11 pages).
United States Patent Office Action for U.S. Appl. No. 10/862,456 dated Dec. 24, 2009 (7 pages).
United States Patent Office Action for U.S. Appl. No. 10/862,456 dated Jun. 18, 2010 (8 pages).
United States Patent Office Action for U.S. Appl. No. 10/862,456 dated Nov. 19, 2010 (5 pages).
United States Patent Office Action for U.S. Appl. No. 10/874,264 dated Apr. 29, 2008 (7 pages).
United States Patent Office Action for U.S. Appl. No. 10/874,264 dated Aug. 15, 2006 (10 pages).
United States Patent Office Action for U.S. Appl. No. 10/874,264 dated Aug. 28, 2009 (8 pages).
United States Patent Office Action for U.S. Appl. No. 10/874,264 dated Feb. 24, 2006 (6 pages).
United States Patent Office Action for U.S. Appl. No. 10/874,264 dated Feb. 7, 2007 (9 pages).
United States Patent Office Action for U.S. Appl. No. 10/874,264 dated Jul. 12, 2007 (8 pages).
United States Patent Office Action for U.S. Appl. No. 10/874,264 dated Mar. 12, 2009 (8 pages).
United States Patent Office Action for U.S. Appl. No. 10/874,264 dated Nov. 13, 2007 (8 pages).
United States Patent Office Action for U.S. Appl. No. 10/874,264 dated Oct. 2, 2008 (8 pages).
United States Patent Office Action for U.S. Appl. No. 11/247,253 dated Apr. 15, 2008 (8 pages).
United States Patent Office Action for U.S. Appl. No. 11/247,253 dated Dec. 31, 2007 (6 pages).
United States Patent Office Action for U.S. Appl. No. 11/247,253 dated Feb. 7, 2007 (7 pages).
United States Patent Office Action for U.S. Appl. No. 11/247,253 dated May 24, 2008 (6 pages).
United States Patent Office Action for U.S. Appl. No. 11/381,849 dated Apr. 23, 2009 (30 pages).
United States Patent Office Action for U.S. Appl. No. 11/381,849 dated Aug. 4, 2009 (3 pages).
United States Patent Office Action for U.S. Appl. No. 11/381,849 dated Nov. 28, 2008 (17 pages).

United States Patent Office Action for U.S. Appl. No. 11/381,849 dated Oct. 19, 2009 (34 pages).
United States Patent Office Action/Notice of Allowance for U.S. Appl. No. 11/381,849 dated Jun. 1, 2010 (14 pages).
United States Patent Office Action for U.S. Appl. No. 12/508,758 dated Dec. 30, 2009 (19 pages).
United States Patent Office Action for U.S. Appl. No. 12/508,758 dated Sep. 21, 2010 (9 pages).
United States Patent Office Notice of Allowance for U.S. Appl. No. 12/508,758 dated Feb. 4, 2011 (4 pages).
United States Patent Office Action for U.S. Appl. No. 10/080,330 dated Jun. 5, 2003 (14 pages).
United States Patent Office Action for U.S. Appl. No. 10/080,330 dated May 5, 2004 (5 pages).
United States Patent Office Action for U.S. Appl. No. 10/870,938 dated Aug. 8, 2005 (8 pages).
United States Patent Office Action for U.S. Appl. No. 10/870,938 dated Jan. 27, 2006 (9 pages).
United States Patent Notice of Allowance for U.S. Appl. No. 10/870,938 dated Aug. 10, 2006 (7 pages).
United States Patent Office Action for U.S. Appl. No. 10/870,946 dated May 31, 2006 (11 pages).
United States Patent Office Action for U.S. Appl. No. 10/870,946 dated Nov. 22, 2006 (10 pages).
United States Patent Office Action for U.S. Appl. No. 10/870,946 dated May 1, 2007 (13 pages).
United States Patent Office Action for U.S. Appl. No. 10/870,946 dated Oct. 15, 2007 (14 pages).
United States Patent Office Action for U.S. Appl. No. 10/953,369 dated Nov. 17, 2005 (5 pages).
United States Patent Office Action for U.S. Appl. No. 10/953,369 dated Apr. 17, 2006 (8 pages).
United States Patent Office Action for U.S. Appl. No. 10/953,369 dated Mar. 29, 2007 (5 pages).
United States Patent Office Action for U.S. Appl. No. 10/953,368 dated Jan. 8, 2008 (7 pages).
United States Patent Office Action for U.S. Appl. No. 10/953,390 dated Jun. 1, 2006 (11 pages).
United States Patent Office Action for U.S. Appl. No. 10/953,390 dated Feb. 14, 2007 (11 pages).
United States Patent Office Action for U.S. Appl. No. 10/953,390 dated Sep. 5, 2007 (9 pages).
United States Patent Office Action for U.S. Appl. No. 10/953,390 dated Nov. 15, 2007 (7 pages).
United States Patent Notice of Allowance for U.S. Appl. No. 10/954,612 dated Mar. 10, 2006 (5 pages).
United States Patent Notice of Allowance for U.S. Appl. No. 10/954,612 dated Aug. 25, 2006 (5 pages).
United States Patent Notice of Allowance for U.S. Appl. No. 10/954,612 dated Aug. 14, 2007 (5 pages).
United States Patent Notice of Allowance for U.S. Appl. No. 10/954,612 dated Oct. 29, 2007 (5 pages).
United States Patent Office Action for U.S. Appl. No. 10/954,612 dated Dec. 11, 2007 (7 pages).
United States Patent Office Action for U.S. Appl. No. 10/954,612 dated Apr. 16, 2008 (7 pages).
United States Patent Office Action for U.S. Appl. No. 10/954,612 dated Oct. 20, 2008 (6 pages).
United States Patent Office Action for U.S. Appl. No. 11/559,231 dated Oct. 19, 2009 (17 pages).
United States Patent Office Action/Notice of Allowance for U.S. Appl. No. 11/559,231 dated May 21, 2010 (5 pages).
United States Patent Office Action for U.S. Appl. No. 11/979,124 dated Jun. 18, 2009 (9 pages).
United States Patent Office Action for U.S. Appl. No. 11/980,559 dated Jun. 19, 2009 (9 pages).
United States Patent Office Action for U.S. Appl. No. 11/980,559 dated Nov. 5, 2009 (9 pages).
United States Patent Office Notice of Allowance for U.S. Appl. No. 11/980,559 dated Jan. 18, 2011 (4 pages).
United States Patent Office Action for U.S. Appl. No. 12/694,361 dated Aug. 2, 2010 (7 pages).
United States Patent Office Action Notice of Allowance for U.S. Appl. No. 12/694,361 dated Dec. 30, 2010 (4 pages).
United States Patent Office Action for U.S. Appl. No. 13/086,575 dated May 26, 2011 (9 pages).
United States Patent Office Action for U.S. Appl. No. 11/687,272 dated Apr. 17, 2009 (10 pages).
United States Patent Office Action for U.S. Appl. No. 12/759,510 dated Dec. 27, 2010 (10 pages).
United States Patent Office Notice of Allowance for U.S. Appl. No. 12/759,510 dated Jun. 1, 2011 (5 pages).
United States Patent Office Action Notice of Allowance for U.S. Appl. No. 13/101,746 dated Apr. 4, 2012 (11 pages).

* cited by examiner

RFID READER ENCLOSURE AND MAN-O-WAR RFID READER SYSTEM

CROSS REFERENCE TO RELATED APPLICATIONS

This application is a continuation of U.S. application Ser. No. 12/759,510 filed Apr. 13, 2010, now U.S. Pat. No. 8,031,072, which is a continuation of U.S. application Ser. No. 11/687272, filed Mar. 16, 2007, now U.S. Pat. No. 7,710,275. These applications are incorporated herein by reference in their entirety.

FIELD OF THE INVENTION

The present invention relates to an RFID reader apparatus, system, and method.

BACKGROUND OF THE INVENTION

An RFID reading system has been developed which can, for example, read RFID tags stored within a cabinet, a refrigerator, a room, etc. Based on the tags read, the system can determine inventory information. One example of such a system is Dearing, et al.'s US 2002/0183882 A1 from Promega Corporation.

SUMMARY OF THE INVENTION

In one aspect, the present invention relates to an apparatus comprising: (a) an enclosure; and (b) an RFID reader disposed in the enclosure, wherein the enclosure is configured to be mounted on an exterior surface of a storage container, wherein the RFID reader is configured to perform RFID reading for an area inside the storage container using an RFID antenna external to the enclosure, wherein the RFID antenna is disposed in the storage container, wherein the enclosure has an opening on a side of the enclosure, and wherein an electrical connection between the RFID reader and the RFID antenna extends through the opening of the enclosure in such a manner that the electrical connection is not externally accessible when the enclosure is mounted on the exterior surface of the storage container. Preferably, the apparatus further comprises a human-machine interface including a display screen. Preferably, the apparatus further comprises a controller that is configured to (a) send an instruction to the RFID reader to perform RFID reading, (b) receive a RFID scanning result from the RFID reader, and (c) send information in response to the RFID scanning result to a database system via a network connection. Preferably, the RFID antenna is disposed within a wall of the storage container but it is not required that it be so disposed. Preferably, the storage container is a cabinet. Preferably, the cabinet is a refrigerated cabinet. A human-machine interface for the apparatus may use a display provided separately from the enclosure. Preferably, the opening of the enclosure communicates with an opening on the exterior surface of the storage container when the enclosure is mounted on the exterior surface of the storage container.

In another aspect, the present invention relates to an apparatus comprising: an RFID reader configured (a) to perform RFID reading for an area within a first storage container using a first antenna and (b) to perform RFID reading for an area within a second storage container using a second antenna. Preferably, the apparatus is connected to the first storage container and the second storage container. Preferably, the apparatus is disposed between the first storage container and the second storage container. Preferably, the apparatus is connected to the first storage container and the second storage container so that an electrical connection between the RFID reader and the first antenna is not externally exposed and an electrical connection between the RFID reader and the second antenna is not externally exposed. Preferably, wherein the first storage container is a cabinet and the second storage container is a cabinet, which cabinets may be refrigerated or ambient, for example.

In yet another aspect, the present invention relates to a system comprising three of the aforementioned apparatuses, each scanning a respective one of three pairs of cabinets.

In a still further aspect, the present invention relates to a method comprising performing RFID reading for an area within a first storage container and an area within a second storage container using an RFID reader connected both to a first antenna and a second antenna, the first antenna being used for performing reading for the area within the first storage container and the second antenna being used for performing reading for the area within the second storage container.

In yet another aspect, the present invention relates to a system comprising: (1) a first apparatus comprising a first RFID reader configured to perform RFID reading using a first antenna; and (2) a second apparatus comprising (a) a second RFID reader configured to perform RFID reading using a second antenna, and (b) a controller configured to (i) control the first RFID reader and the second RFID reader and (ii) communicate via a network connection with an inventory management system. Preferably, the first apparatus and the second apparatus are connected via a local area network, and the second apparatus further comprises a network connection between the second RFID reader and the controller. Preferably, the controller comprises a user interface for controlling the first RFID reader and the second RFID reader. Preferably, the controller is configured to control the first RFID reader to perform plural RFID scans, to obtain a first RFID scanning result in accordance with the plural RFID scans by the first RFID reader, to control the second RFID reader to perform plural RFID scans, to obtain a second RFID scanning result in accordance with the plural scans by the second RFID reader, and to communicate with the inventory management system in accordance with the first RFID scanning result and the second RFID scanning result. Preferably, the first RFID scanning is based on a difference between plural RFID scans.

In a still further aspect, the present invention relates to means for attaching an RFID reader to a refrigerator so that wiring between the RFID reader and an RFID antenna in the refrigerator is not externally exposed.

Yet another aspect of the present invention is a system comprising: (1) a master RFID reading apparatus comprising an RFID reader and (2) one or more secondary RFID reading apparatuses each comprising a respective RFID reader, wherein the master RFID reading apparatus further comprises control means for controlling (a) the RFID reader of the master RFID reading apparatus and (b) via networking between the master RFID reading apparatus and the one or more secondary RFID reading apparatuses, the RFID reader of each of the one or more secondary RFID reading apparatuses. Preferably, the master RFID reading apparatus uses the RFID reader to perform RFID scanning of a storage container, and the one or more secondary RFID reading apparatuses use their respective RFID readers to perform RFID scanning of a respective plurality of other storage containers.

These and other objects, aspects, advantages and features of the present invention will become more apparent from the following detailed description of the presently preferred embodiments taken in conjunction with the accompanying drawings.

DETAILED DESCRIPTION OF THE PREFERRED EMBODIMENTS

Figure 1:
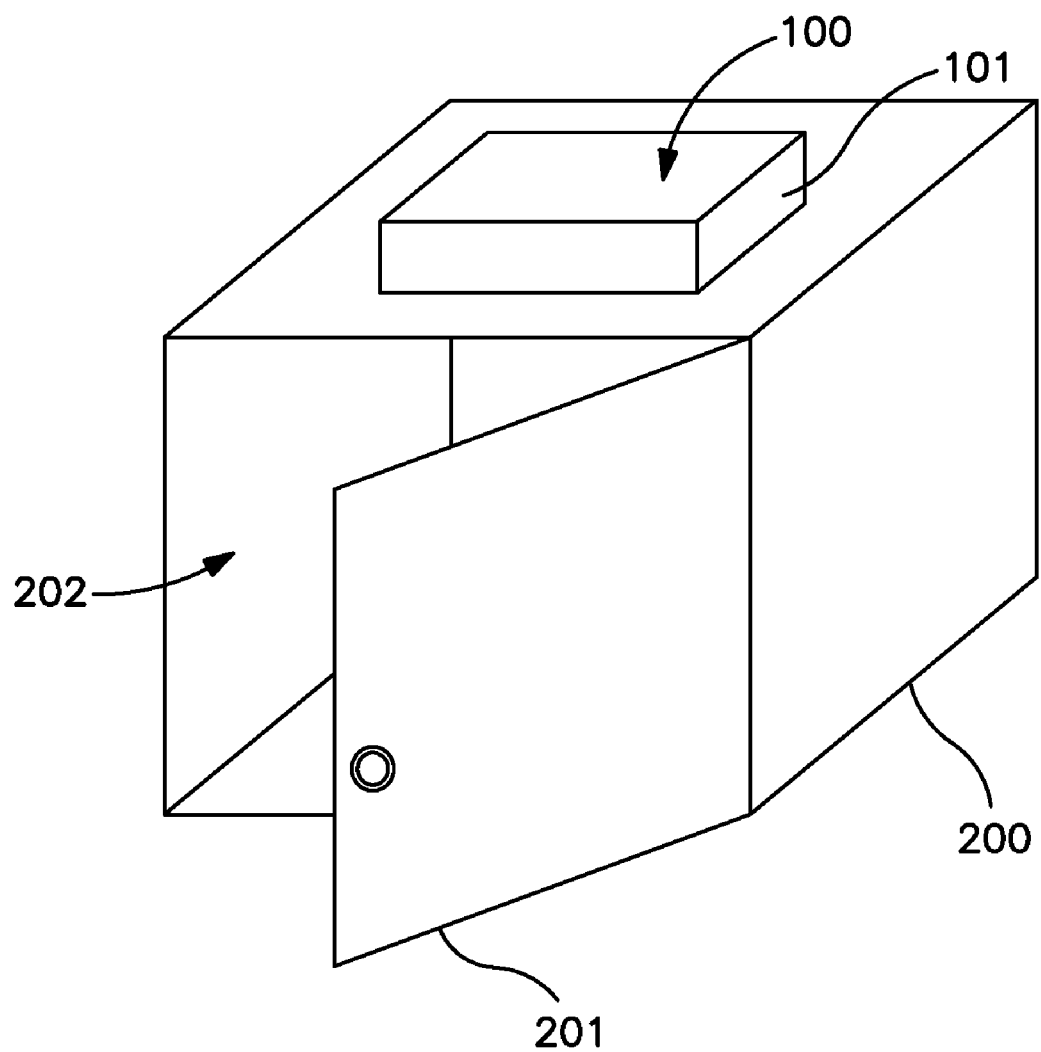
FIG. 1 is a perspective view showing an embodiment of the present invention, an RFID apparatus which is mounted on a storage container such as a refrigerator.

FIG. 1 shows an embodiment of the present invention. In that figure, reference numeral 100 denotes an RFID apparatus for performing RFID reading; reference numeral 101 denotes an enclosure of the apparatus 100; reference numeral 200 identifies a storage container; reference numeral 201 indicates a door of the storage container 200 that can open and close; and reference numeral 202 indicates the interior of the storage container 200, which is an area to be RFID scanned to determine the presence of any RFID tag or tags therein.

As will be discussed hereinbelow in more detail, preferably, the apparatus further includes one or more of an ethernet connection (used for, e.g., TCP/IP communication over a network), a serial connection, an IEEE1394 connection, a USB connection, and a telephone connection. The foregoing can be used to send an RFID scanning result to a remote backend inventory management system (e.g., database, ERP system, or financial packages such as Microsoft Dynamics or Quickbooks), or to allow a plurality of the apparatuses to communicate with each other.

The Storage Container

The storage container may be, for example, a cabinet, ambient cabinet (i.e., room temperature cabinet), refrigerated cabinet (e.g., conventional refrigerator or freezer), etc.

The RFID Apparatus

We will now describe RFID apparatus 100 in more detail. Preferably, apparatus 100 includes a modular enclosure 101 that can be mounted (i.e., is mountable) on storage container 200. Enclosure 101 preferably contains at least an RFID reader.

Enclosure 101 may be mounted on storage container 200 in a variety of ways. For example, enclosure 101 may be mounted horizontally (e.g., on a side surface of storage container 200) or vertically (e.g., on a top or bottom of storage container 200). Preferably, enclosure 101 has corner holes through which enclosure 101 can be bolted to an exterior surface of storage container 200 (e.g., freezer, refrigerator, cabinet, etc.). Alternatively, magnets could be used. Preferably, enclosure 101 is securely mounted so it will not easily move around or fall off.

An advantage of the enclosure design is that it is a portable, retrofitable modular enclosure that can be connected by a field engineer to any type of storage container, cabinet, shelf, or the like in the field. For example, the engineer could install an RFID antenna in the wall of a standard, conventional refrigerator and could bolt the enclosure to an exterior surface of the refrigerator.

Another advantage of the foregoing is that since the RFID reader with its circuitry for driving and controlling the RFID antenna preferably is all contained within the enclosure, rather than being disposed, for example, in the storage cabinet itself, it should be much cheaper and easier to access the RFID reader for servicing, upgrade, and the like.

Figure 2:
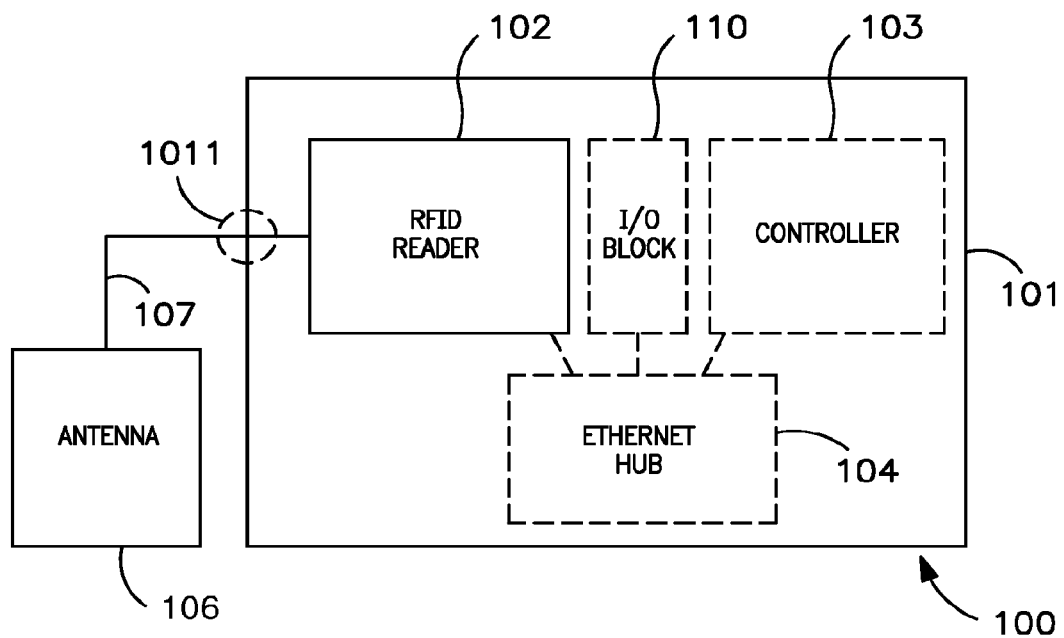
FIG. 2 is a schematic diagram showing the interconnection of parts of the RFID apparatus according to an embodiment of the present invention.

FIG. 2 depicts apparatus 100 in more detail. In this figure and all other figures, reference numerals that are the same as those in other figures have the same meaning, unless otherwise specified. In FIG. 2, reference numeral 102 denotes the RFID reader; reference numeral 103 denotes a controller (or controller circuit); reference numeral 104 denotes an ethernet hub; reference numeral 106 is an RFID antenna; reference numeral 107 is an electrical connection between RFID reader 102 and RFID antenna 106; reference numeral 110 is an I/O block; and reference numeral 1011 is an access port, opening, or hole in enclosure 101.

The depicted connection between ethernet hub 104 and RFID reader 102 is an ethernet connection, and the connection between ethernet hub 104 and controller 103 also is an ethernet connection, preferably. In other words, in the preferred embodiment, controller 103 communicates with RFID reader 102 (via ethernet hub 104) using an ethernet network connection. Thereby, controller 103 can control, for example, the timing of initiation of an RFID scan by RFID reader 102 by sending a command across the connection, and, through the connection, controller 103 can, for example, receive the results of the scan from RFID reader 102. However, the invention is not limited to use of ethernet. Other communication techniques could instead be used (e.g., USB).

As mentioned above, preferably the enclosure 101 contains at least RFID reader 102; optionally, controller 103, ethernet hub 104, and I/O block 110 may also be included along with RFID reader 102, or they may be omitted. Preferably, all are included, or I/O block 110 is included with RFID reader 102 while controller 103 and ethernet hub 104 are omitted.

As mentioned above, reference numeral 1011 denotes an access port, opening, or hole of enclosure 101 (e.g., an opening on the exterior surface of enclosure 101) through which electrical connection (e.g., wire or wiring) 107 passes to connect RFID reader 102 and an RFID antenna 106. By means of this electrical connection, RFID reader 102 can drive and control RFID antenna 106 to send and receive signals. Preferably, RFID antenna 106 is external to enclosure 101.

While we have described using one RFID antenna 106 for a storage container 200, the invention is not so limited. Instead, multiple RFID antennae 106 could be used for one storage container 200. Depending upon the type of products stored within the storage container 200, it may be preferable to have multiple RFID antennae 106 to scan one storage container 200.

The I/O Block

Preferably, apparatus 100 includes an I/O block 110. Preferably, I/O block 110 is connected to ethernet hub 104 by ethernet, and controller 103 is also connected to ethernet hub 104 by ethernet, so controller 103 can send and receive signals to and from I/O block 110. Preferably, I/O block 110 has a plurality of inputs and outputs (such as digital, analog, etc.) and has a built-in two-port ethernet hub. If controller 103 and ethernet hub 104 are omitted, the ethernet hub of I/O block 110 can be used to forward commands received from an external controller 103 to RFID reader 102. I/O block 110 can connect to an authentication unit such as a passreader which reads any of a passcard, biometric information, etc. of the user, and provides the information read to controller 103. I/O block 110 can also provide temperature information to controller 103. I/O block 110 can also control a lock of storage container 200, at the direction of controller 103, to lock and unlock the door of storage container 200 to control access to the storage container 200.

The RFID Reader

RFID readers are commercially available and a conventional RFID reader may be used as RFID reader 102. RFID reader 102 includes (a) circuitry to drive an RFID antenna to send RF signals and (b) circuitry to process any responses received back from an RFID tag or tags, i.e., RFID reader 102 performs RFID scanning. The RFID reader that we prefer to use is capable of connecting to a plurality of RFID antennae. Preferably, RFID reader 102 also has an ethernet port providing a network connection by which it can be controlled. In particular, RFID reader 102 has a command set by which it can be controlled, and commands can be sent to RFID reader 102 via its ethernet port to instruct RFID reader 102 to, for example, perform an RFID scan using RFID antenna 106 and return a list of tags read based on signals received from an RFID tag or RFID tags.

The Controller

Preferably, but optionally, the apparatus 100 may include the controller 103. Controller 103 preferably is a device, circuit, or computer (such as, for example, an embedded computer) for controlling RFID reader 102. Preferably, controller 103 authenticates a user seeking access to the storage container 200, sends a signal to unlock a door of the storage container 200 in response to authentication of the user, instructs RFID reader 102 to perform a scan in response to closing of the door, and calculates a difference between an RFID scan result returned by RFID reader 102 and an earlier RFID scan result returned by RFID reader 102 to determine if any RFID tags have been removed or added.

Preferably, to determine whether a user has taken from a storage container or added to the storage container any tags or tagged items, controller 103 calculates a difference (referred to as a "delta") between a first RFID scanning result obtained before the door of the storage container is opened (referred to as the "baseline" scan) and a second RFID scanning result obtained after the door of the storage container has been closed again. However, the determination is not so limited. For example, another possibility would be to perform an additional RFID inventory scan after the user's passkey is read but before the door is opened. This additional scan could be combined with the baseline scan to form a superset (i.e., containing any tags found in one or both of the baseline scan and the additional scan), to which the second RFID scanning result could be compared. An advantage of this arrangement is to aid in scanning what we call "blinking tags". A "blinking tag" is a tag which might be read during one scan but not during another, for whatever reason. For example, a blinking tag might be read during 50% of scans. By performing both a baseline scan and the additional scan, it might be possible to discover the blinking tag even if it were not read during the baseline scan.

Preferably, controller 103 communicates with RFID reader 102 via ethernet, and most preferably through an ethernet hub 104 that interconnects controller 103 and RFID reader 102 and that interconnects controller 103 and I/O Block 110. Most preferably, the controller 103, RFID reader 102, I/O Block 110, and ethernet hub 104 are all disposed inside enclosure 101.

Preferably, as will be discussed below with respect to FIG. 9, controller 103 has a second ethernet controller (network interface) for connecting to a backend inventory management system through, for example, the internet.

Preferably, controller 103 is a computer that uses an operating system such as Windows CE or Linux, and that executes a computer-executable computer program stored in a computer-readable memory associated with the computer to effect all of the actions, signals, and communication discussed in this application. However, controller 103 is not so limited, and may take other forms of hardware or software as long as it supports the requirements of the system.

Preferably, controller 103 will provide a human-machine interface (i.e., user interface), and controller 103's operating system will be Windows CE 5.0. Controller 103 preferably will also have Microsoft's .NET Compact Framework version 2.0 at a minimum installed. Of course, other operating systems can be used in place of Windows CE 5.0. Preferably, those other operating systems would also support the .NET Framework. This makes the software portable so that it may run on any Windows operating system that has .NET framework installed on it.

Most preferably, controller 103 is in the form of an all-in-one HMI (human-machine interface)/Embedded PC running Microsoft Windows CE 5.0. Future units may have the HMI separate from the controller or no HMI at all, depending on the needs of the individual customer. The Windows CE image can either be provided by the vendor of apparatus, or a custom image can be created, tailed to the specific needs of a particular apparatus 100.

As mentioned above, preferably a computer program executed by controller 103 provides the functionality of apparatus 100 such as RFID scanning, inventory management, communication, etc. We will refer to this program as the Application Program.

Another related application developed for the apparatus 100 is simply referred to as the bootstrapper, which handles the updating of the Application Program, and its related files.

The Application Program

We will now describe the Application Program in more detail.

Preferably, the Application Program is written on top of the Microsoft .NET Compact Framework version 2.0, using industry standard best practices. Development using the Compact Framework allows the Application Program to be redeployed on any Windows CE 5.0 device that has the compact framework installed. This includes devices that have a different underlying architecture such as ARM 4, x86 and MIPS. This level of flexibility allows the manufacturer of apparatus 100 to select or change controller 103 depending on customer needs, new technology offerings, and lower prices. In addition to moving from device to device, the Compact Framework will allow a smooth transition to newer versions of Windows CE, such as the new version 6.0. As an added benefit, the majority of the Application Program can be easily recompiled to run under the full version of the Microsoft .NET Framework, and because of this, run on standard x86 hardware running Windows operating systems, such as Microsoft Windows XP, or Embedded Windows XP. This provides two key benefits, the first being additional flexibility for customers, the second being excellent opportunities for code reuse.

Windows CE supports multi-threaded applications, and the Application Program takes advantage of this to provide a robust and interactive experience to the user of the apparatus 100. The Application Program can, for example, (a) handle communications between apparatus 100 and peripherals, (b) handle communications between apparatus 100 and backend system 1057, (c) display a user interface to the user, and (d) accept input from the user. This is considered a best practice, and will be what a user/customer expects.

Turning to the architecture of the Application Program, preferably the program is separated into a main executable, which contains the user interface screens, compiled for the Compact Framework, and several satellite assemblies (e.g., class libraries in the form of compiled DLL files). Great care was taken in the architecture of The Application Program with regard to the separation of functionality between components, which allows for code re-use in the Application Program itself, as well as in other related applications, ease of maintainability, and ease of upgradeability.

One of the key features in the separation of components is the use of an Object Orientated design using Interfaces and Abstract Base Classes to build a foundation upon which the rest of the application can be built. The use of Interfaces allows for the main application logic of the Application Program to remain isolated from changes in hardware (RFID Readers, RFID Transponders, I/O blocks), as well as other pieces of software, such as communications and the data store. Building upon the interfaces are Abstract Base classes which implement the signatures of the various interfaces to provide shared functionality. In the event that a situation arises where the Abstract class is too specific, we have the interface to fall back on.

An example of this design is the implementation of the logic in the Application Program to interface with the RFID reader 102. The preferred model of RFID reader 102 that we use is the Magellan MARS reader (of course, we mention this model by way of example and not of limitation). An Interface named IDevice was created, which all device logic must implement. An abstract base class called DeviceBase implements IDevice and provides common functionality seen in the majority of devices we will be using. Another Interface named IScanner provides the starting point for all RFID scanners, and again, the abstract class ScannerBase provides base functionality. Finally, the concrete class MarsReader was implemented to provide a specific implementation that conforms to the signatures of the interfaces, but in a way that allows for interaction with the Mars Reader. The main application logic in the Application Program does not have to be changed at all once the interfaces (which are used for all devices and all scanners) are defined.

As a result, is that it is extremely easy to add new pieces of hardware to the apparatus 100 (e.g., to use a different model of RFID reader 102). To do so, one can simply create a new class library that implements the required interfaces, compile, and deploy. This is a major advancement over conventional systems, where new hardware would most likely result in a complete re-write of the application.

As with the current controller and software, the Application Program supports remote updates of configuration parameters, as well as updates to the application itself. This is handled by the bootstrapper, which runs in place of the Application Program, so that the Application Program files can be updated (generally, one cannot update files that are in use). In addition to updates related to the Application Program, new device drivers, OS hot fixes, and new advertisements can be downloaded to the apparatus 100 (e.g., via a network connection).

Preferably, the data store for the Application Program is in the form of a Microsoft SQL 2005 Compact Edition database, the latest version of the mobile line of databases offered by Microsoft. The database will store configuration information, transactions, and logging information. The latest version of SQL mobile offers features usually found only in desktop and server versions of database, key among those being atomic transactions. An atomic transaction guarantees that a group of data written to the database is either completely written, or none of it is written. This helps maintain consistency within the database, and makes the Application Program that much more robust. While SQL2005 is preferred, other data stores could be used. For example, a flat file could be used, or XML, among others.

Communication between the Application Program and peripherals associated with apparatus 100 is done over USB, Serial, or Ethernet, for example. Given the USB interface, there is the option to hook up non-standard communication busses (such as RS-485) through the use of a USB converter. Some of the devices that hook up via USB actually emulate a network interface card (NIC), or a virtual COM port. This is made possible due to the open, standards based approach taken with Windows CE. Peripherals can be configured manually thru editing the configuration parameters via the HMI, or a semi-automated method can be used. In the semi-automated method, a user can instruct the Application Program to scan for new devices. The Application Program will report back devices that it has discovered but are currently not configured. The user can then select the device to associate and configure it with the Application Program. Peripherals can be identified by the COM port they are plugged into, their USB ID, or their Ethernet MAC address.

The Human-Machine (User) Interface

As mentioned above, controller 103 may also provide a human-machine interface (HMI) (or user interface) to allow a user to interact with or control the apparatus 100. (Where controller 103 does support the HMI interface, the controller 103 and HMI may be integrated together, in which case references herein to HMI or controller should be considered the same device.) For example, the controller 103 could drive a display provided on the enclosure to display the user interface. Such a display could be mounted, for example, on a front surface of the enclosure 101, as shown by reference numeral 1052 in FIG. 12. The display 1052 could be an LCD screen. Preferably, the HMI comprises, as the display 1052, a VGA 5.7" touch screen mounted to the front removable panel. The display 1052 could show the status of the apparatus. Controller 103 could also cause the display to display diagnostic information to allow an engineer to check the status of the machine or otherwise troubleshoot it.

Localization

The Application Program will support a variety of user personalization including but not limited to, localization (multiple language support), and target advertisements.

As for localization, each user preferably will be able to choose a default language they wish to use when interacting with the UI portion of the Application Program; controller 103 could select a language for display based on the identity of the user. For example, controller 103 might display the user interface in Spanish if controller 103 concluded that such was the user's preferred language.

This will increase the number of international markets apparatus 100 will be able to be deployed to, as well as meet customer and possibly government requirements.

Targeted and General Advertising

The Application Program will also support targeted advertising, to allow for sellers of apparatus 100 to configure and display advertisements to users of apparatus 100 based on their past and current purchases, and any ongoing sales promotions. For example, display 1052 could provide marketing advertisements targeted at a user of the apparatus, e.g., if it were recognized (e.g., by controller 103) that a user had purchased an item before, then controller 103 might control display 1052 to display an advertisement offering a sale price on that item to encourage the user to purchase the item again.

Targeted advertising may be, but is not limited to, a small area on the screen when the user is selecting which unit (i.e., storage container) they are trying to gain access to, a full screen advertisement after they select which unit they are going into, or a popup style advertisement that appears when the user first presents their pass.

In more detail, controller 103 preferably also shall have the ability to run general advertising in addition to targeted advertising. General advertising will run while the unit is sitting not doing anything that requires a user present.

Users will be able to select an advertisement, and request more information. This will be handled by the Application Program sending a transaction back to the backend system 1057 in accordance with the selection. The backend system 1057 will forward the request on to the appropriate sales staff.

"Headless" Configuration

It is not required that the HMI be included. Instead, the apparatus 100 could be "headless", i.e., it would not have a display of its own. Instead, the apparatus could be configured so that it could be controlled remotely, e.g., across an ethernet, USB, or serial connection.

Externally-Provided HMI

Figure 13:
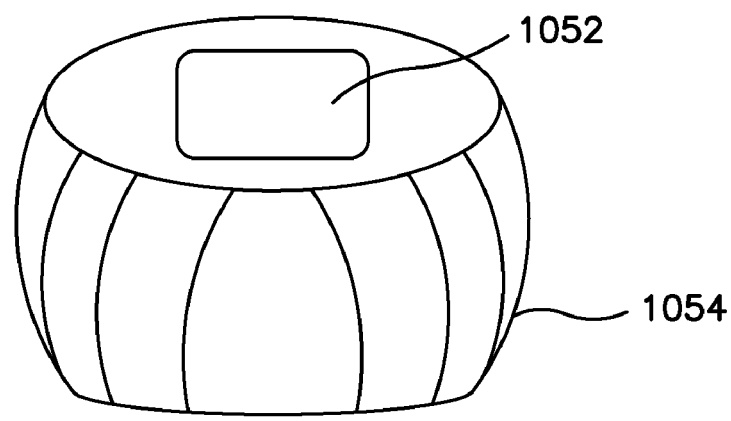
FIG. 13 is a perspective view showing a human-machine interface, called the "8-ball", for use with an embodiment according to the present invention.
Figure 14:
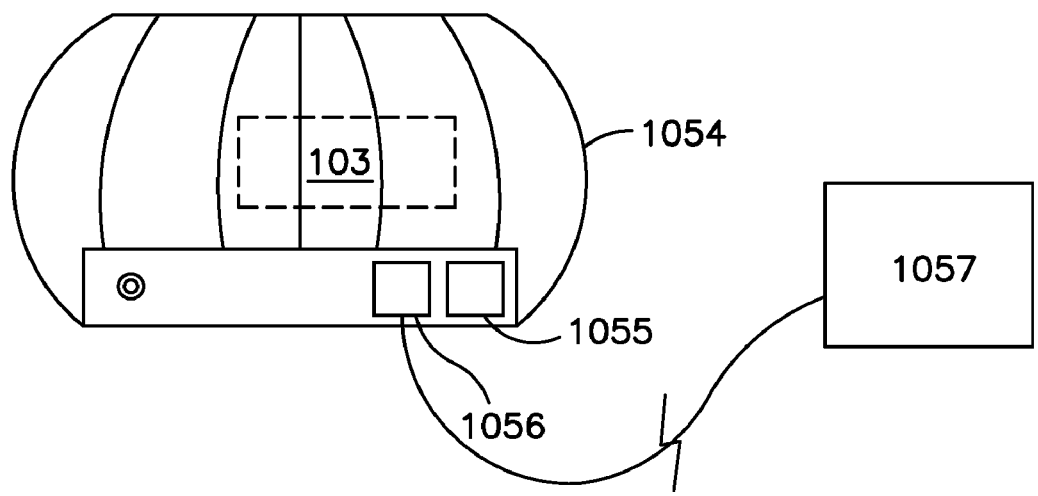
FIG. 14 is a rear view of the 8-ball human-machine interface of FIG. 13.

It is not required that the HMI function or controller 103 be integrally provided in enclosure 101. hi an alternative construction shown in FIGS. 13 and 14, controller 103 and the HMI function thereof have been transferred out of enclosure 101 into an external enclosure 1054. That enclosure is a pumpkin-shaped enclosure that we call an "8-ball", which includes a display screen 1052 and ethernet ports 1055 and 1056. By transferring controller 103 with its HMI, along with a pass reader for authenticating the user, to enclosure 1054, enclosure 101 can be made smaller. Enclosure 1054 can be placed anywhere in the vicinity of the units (i.e., storage container or containers) it is controlling. Functionality is the same in all respects. To connect the 8-ball enclosure 1054, an Ethernet cable is used to connect from ethernet port 1055 to one of the ethernet ports on enclosure 101. Ethernet port 1056 is used as an external network connection for reporting to the back end inventory management systems, depicted by reference numeral 1057 in FIG. 14.

Communications with Backend System

Preferably, communication between controller 103 and the backend system 1057 is through an ethernet interface using via standard web services provided on TCP port 80 or secure web services over TCP port 443 (SSL). Such communication includes but is not limited to software upgrades, diagnostic information, inventory transactions, and advertising.

Preferably, communications are initiated from apparatus 100 only, e.g., from apparatus 100 to backend system 1057. For example, apparatus 100 could send inventory information via a network connection to backend system 1057. An advantage of this is to provide a firewall-friendly and network administrator-friendly communication mechanism. In more detail, generally, whereas outbound communication is acceptable (for a firewall), unsolicited inbound connections are considered taboo and could limit placement of the apparatus 100. However, there are times where a persistent connection between apparatus 100 and backend system 1057, and possibly multiple apparatuses 100 at different locations, would be desirable. In order to accomplish this, apparatus 100 and backend system 1057 will implement an HTTP reflector that allows for a persistent, firewall-friendly connection to be established. An example of this type of connection can be seen in online meeting service such as WebEx, and Microsoft Live Communications Server. In fact, Microsoft Live Communications Server is one option we have for implementing this type of functionality.

Dynamically-Configured Networking

Preferably, the system's software shall support the dynamic discovery of devices as the number of connected secondary apparatuses 100 (as discussed below) increases. The controller 103 shall (either by its operating system or by the Application Program) implement a DHCP server to handle IP addressing of devices (e.g., dynamic addressing) as they are connected. In other words, controller 103 will provide IP addresses to the secondary apparatuses 100 as they are connected. Controller 103 will then attempt to establish connections to the new devices (i.e., apparatuses 100). The devices will be initialized and recognized by the controller 103 for use by attempting to send a given command set to see how the remote device responds. If the device accepts these commands, it will be initialized and installed for controller 103 to control. If the device does not accept these commands, controller 103 will move on to a next set of commands and repeat this process.

Watchdog Feature

Preferably, controller 103 shall also have a WatchDog timer available. This feature will allow the device to attempt to automatically recover if the software hangs.

The RFID Antenna or Antennae

Figure 3:
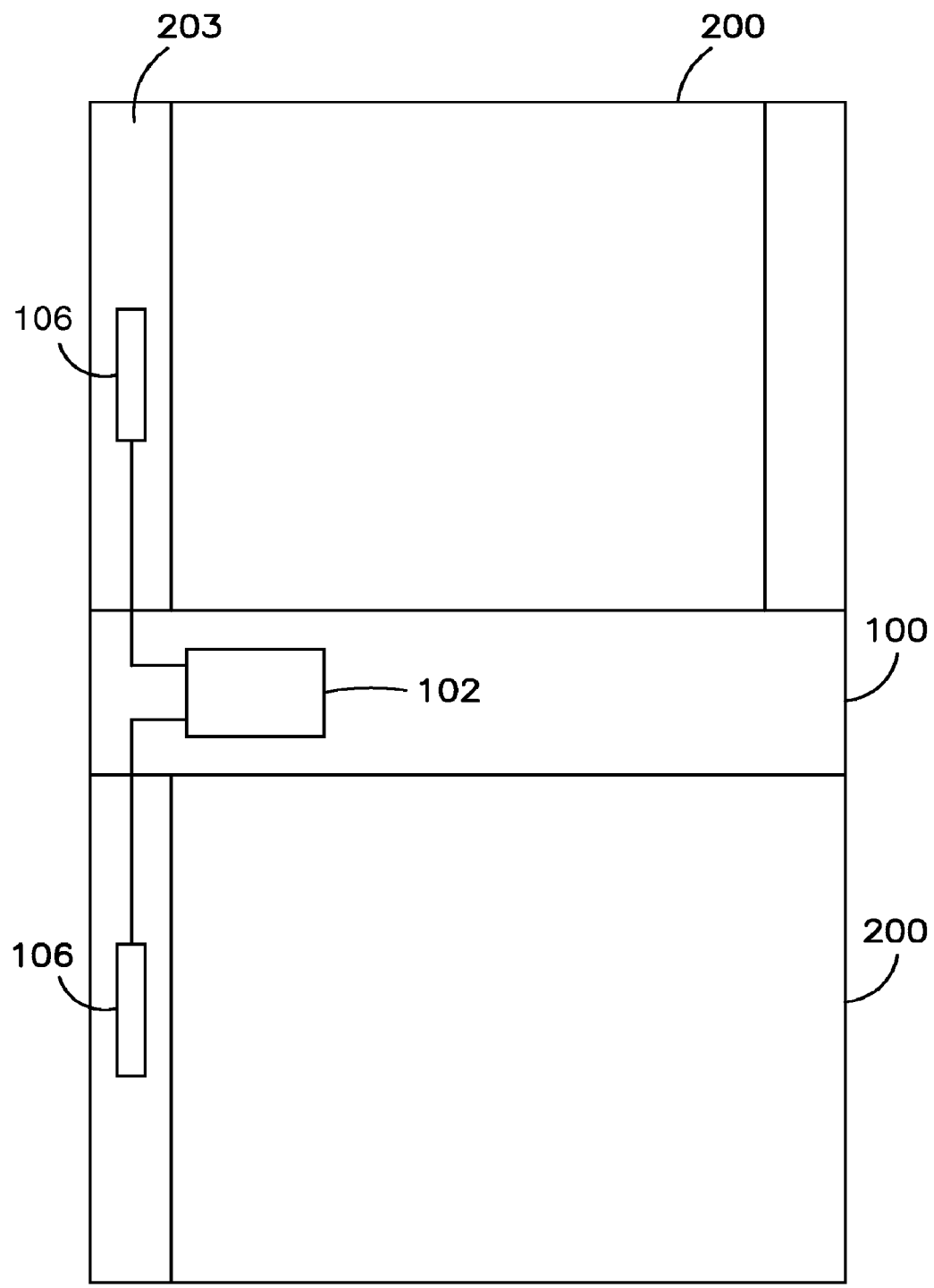
FIG. 3 is a cross-sectional view showing the mounting of an RFID antenna in a wall of the storage container.

Preferably, RFID antenna 106 is external to the enclosure 101. For example, RFID antenna 106 could be disposed in a wall of storage container 200. FIG. 3 depicts such an arrangement. In more detail, that figure shows two RFID antennae 106, each being located in a wall 203 of a respective one of a pair of storage containers 200 that sandwich apparatus 100.

That figure also shows another feature of the present invention. In particular, the invention is not limited to having one RFID antenna 106 connected to RFID reader 102. Instead, RFID reader 102 may be attached to plural RFID antennae 106. The plural antennae may be used for reading areas within separate respective storage cabinets. For example, one antenna might be used to read an area within a first storage cabinet, while a second antenna might be used to read an area within a second storage cabinet. Again, such is shown in FIG. 3 which depicts a tower unit comprising top and bottom storage containers 200 sandwiching apparatus 100 and each having an RFID antenna 106 connected to the same RFID reader 102 of apparatus 100.

Thereby, it is possible for a single RFID reader to be used for plural storage cabinets, as compared with conventional systems where each storage cabinet needs to have its own RFID reader including circuitry for controlling and driving an RFID antenna. Because the present invention's circuitry can be used to scan plural storage cabinets, we think its utilization will be improved as compared to the conventional systems.

Our idea of having one RFID reader using plural RFID antennae for plural storage cabinets is the genesis of the name "RFID man-of-war", given the vision of connections between the RFID reader and many respective plural antennae. If exactly eight antennae were provided, then the system might be referred to as an "RFID octopus".

When RFID antenna 106 is a 13.56 MHz antenna, we prefer to provide a false back wall in the storage container 200, in which wall the antenna is integrally provided. When RFID antenna 106 is a 2.46 GHz antenna and storage container 200 is a refrigerator, we prefer to attach the antenna to the interior surface of the exterior metal chassis of the refrigerator. In that case, the antenna is disposed between the metal exterior wall of the refrigerator and the separate plastic wall of the interior of the refrigerator.

Instead of being on or in a wall of the storage container 200, RFID antenna 106 could also be inside the storage container. For example, RFID antenna 106 could be located on or within a shelf inside storage container 200. The location of RFID antenna 106 is not limited to any of the foregoing positions.

The Enclosure and Its Mounting on the Storage Container

Turning to FIGS. 4 through 8, we will now describe a preferred embodiment of apparatus 100 and its enclosure 101 in more detail. In those figures, reference numeral 1001 denotes a front side of enclosure 101; 1002 denotes four screws for affixing front side 1001 to enclosure 101; 1003 denotes a top side of enclosure 101; 1004 denotes a back side of enclosure 101; 1005 denotes a ventilation system; 1006 denotes a power connector; 1007 denotes a power outlet; 1008 denotes an ethernet port; 1009 denotes a piano-style hinge that allows for the back side 1004 of enclosure 101 to fold down to grant access to the interior of enclosure 101; 1010 denote holes in enclosure 101 for use with bolts or screws; 1011 denote access ports (e.g., holes or openings) in enclosure 101, which can be used for wiring; 1012 denotes a Z bracket that allows for a tray with electronics to be slid in and out—it holds the tray in place as well; 1013 denote holes in storage container 200, which can be used for wiring; and 1014 denote holes in storage container 200, for use with bolts or screws.

In more detail, as explained above, enclosure 101 is designed to hold the electronic components of apparatus 100. Access ports 1011 (i.e., openings or holes) are located on, for example, the bottom (exterior) side of enclosure 101 and/or the top (exterior) side of enclosure 101.

Figure 6:
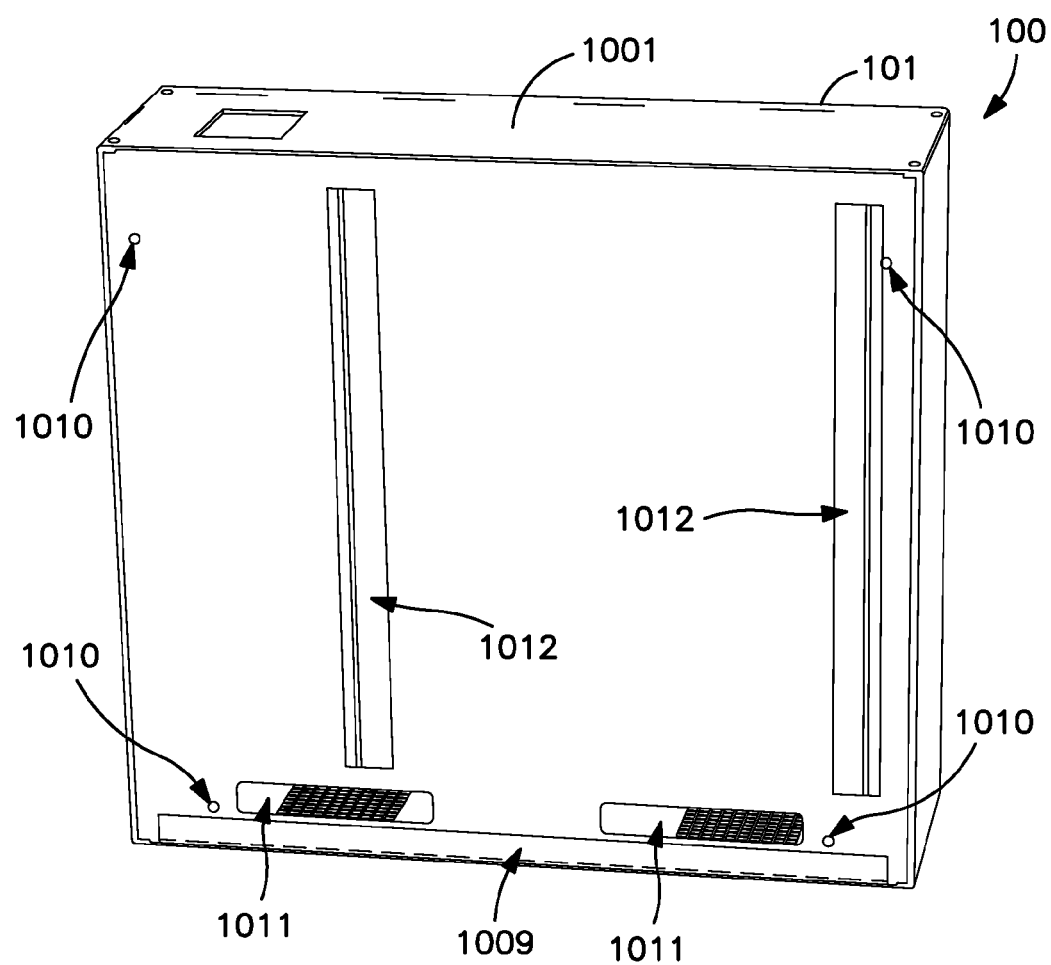
FIG. 6 is a perspective view showing the bottom side of the enclosure of the RFID apparatus according to an embodiment of the present invention.

Preferably, two access ports or openings 1011 are located at the rear end of the bottom side, as shown in FIG. 6. These openings are used to run wiring from enclosure 101 into a storage container 200 located below apparatus 100. Such wiring may provide, for example, an electrical connection between RFID reader 102 and RFID antenna 106 of this lower storage container (for the electrical connection, see item 107, as discussed above).

Two additional access ports 1011 optionally may be located at the rear end of the top side 1001. These openings are used to run wiring from enclosure 101 to a storage container 200 located above apparatus 100. Such wiring may provide, for example, an electrical connection between RFID reader 102 and an RFID antenna 106 of this upper storage container (for the electrical connection, see item 107, discussed above).

These wires (that run through access ports 1011) may include but are not limited to antenna cables (such as, for example, item 107 as discussed above), power cables, and wiring for unit security. These wires then go directly into a storage container above or below the apparatus through holes 1013 in storage container 200 (shown in FIG. 7); this prevents the wires from being tampered with.

In other words, an advantage of the present invention is that, as discussed above, the enclosure is configured to defend the apparatus from attack, e.g., to prevent a person with wire snippers from cutting an electrical connection such as a wire connecting the RFID reader and the RFID antenna. To reiterate, preferably, the enclosure has an access port (e.g., opening) on a side of the enclosure that faces an exterior surface of the storage container. A wire from the RFID reader to the RFID antenna can pass through the opening and into the storage container through a corresponding opening in the storage container. Thus, when the enclosure is mounted on the exterior surface of the storage container, the wire is protected from attack because it is not externally accessible or exposed. Malcontents are prevented from tampering with or disabling the device—wiring can be made to be not externally accessible.

Figure 7:
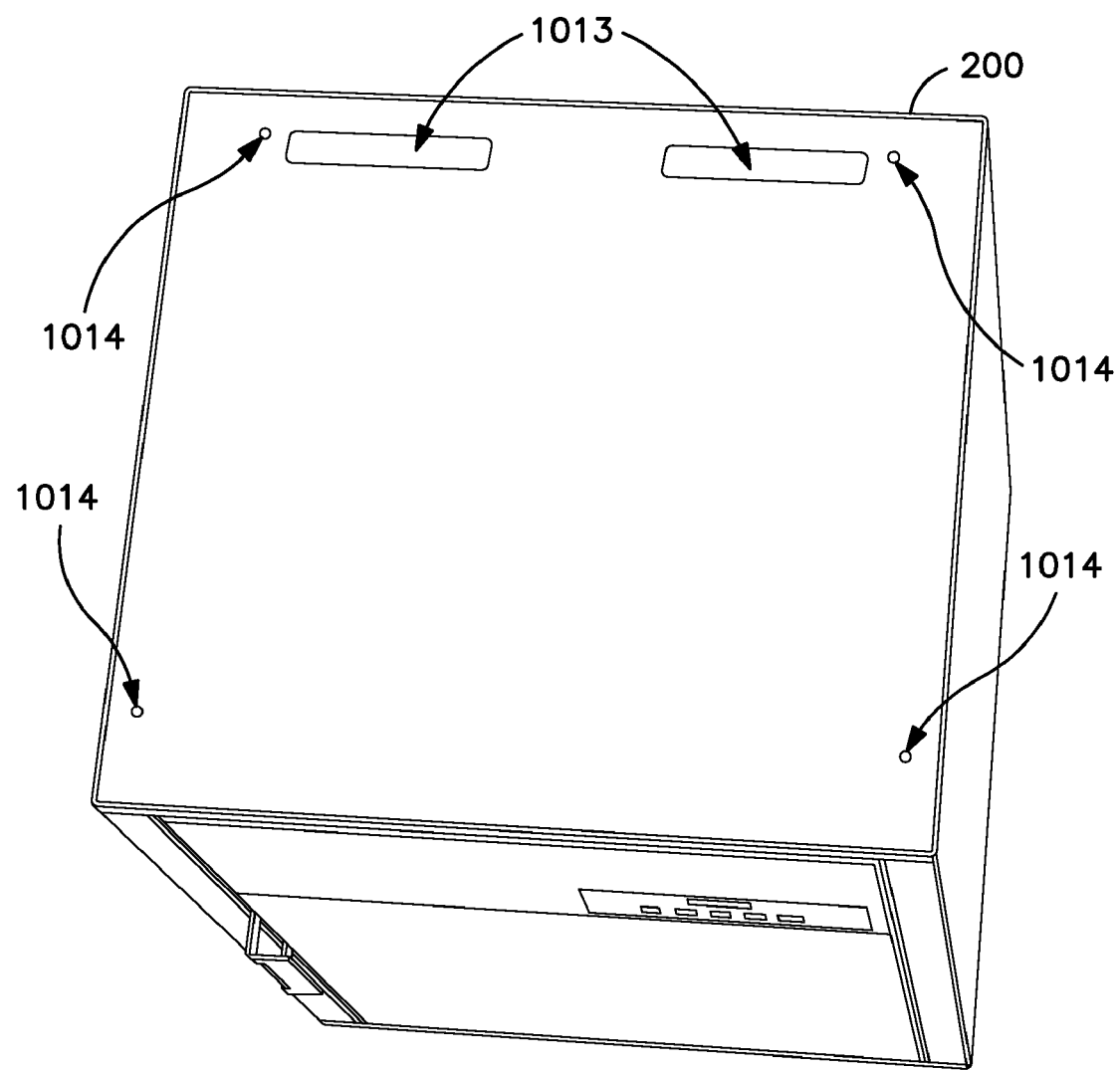
FIG. 7 is a perspective view showing a top side of the storage container.
Figure 8:
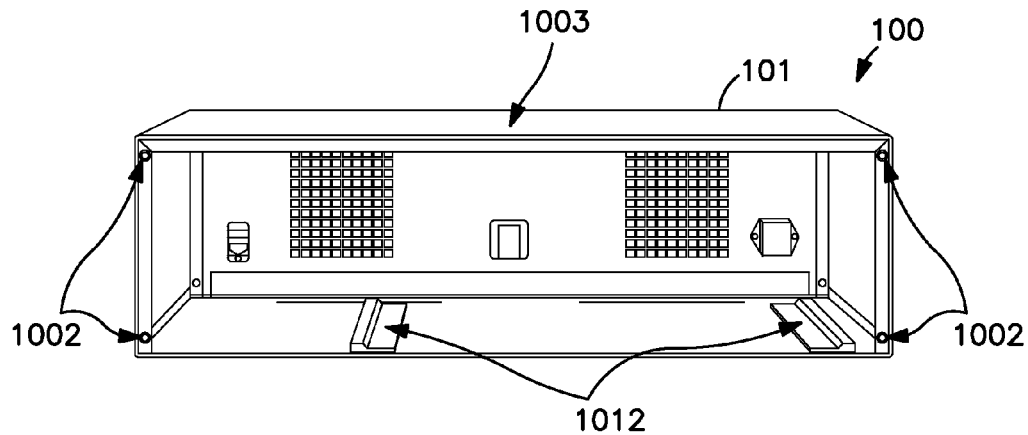
FIG. 8 is a perspective view from front to back of the enclosure, with the front side of the enclosure removed.

Enclosure 101 is also designed to be portable so that it can be easily attached and removed from on top of storage container 200. This is accomplished by attaching screws in the enclosure 101 into the storage container 200 above and/or below. For example, screws could be used in conjunction with holes 1010 in enclosure 101, as shown in FIG. 6, and holes 1014 in enclosure 200, as shown in FIG. 7, to fixedly mount enclosure 101 to storage container 200.

In more detail, to connect the apparatus 100 to the storage container 200, a bolt would be inserted from inside the enclosure 101 through holes 1010 and 1014 and be screwed into the storage container 200. The holes 1010 in the enclosure 101 will be slightly larger than the bolt so a washer will have to be placed on the bolt inside the enclosure 101. A wing nut will then be used to hold the storage container 200 and apparatus 100 together. As a result, the wiring holes 1011 will align with the wiring holes 1013 in the storage container 200. This allows for the wires to be secured inside the unit and not accessible on the outside.

A storage container 200 (e.g., a cabinet) can also be attached to the top of the apparatus 100 using the exact same process.

Screws or bolts do not have to be the only option; a magnetic locking mechanism using magnets, or some other locking mechanism could be used.

Figure 12:
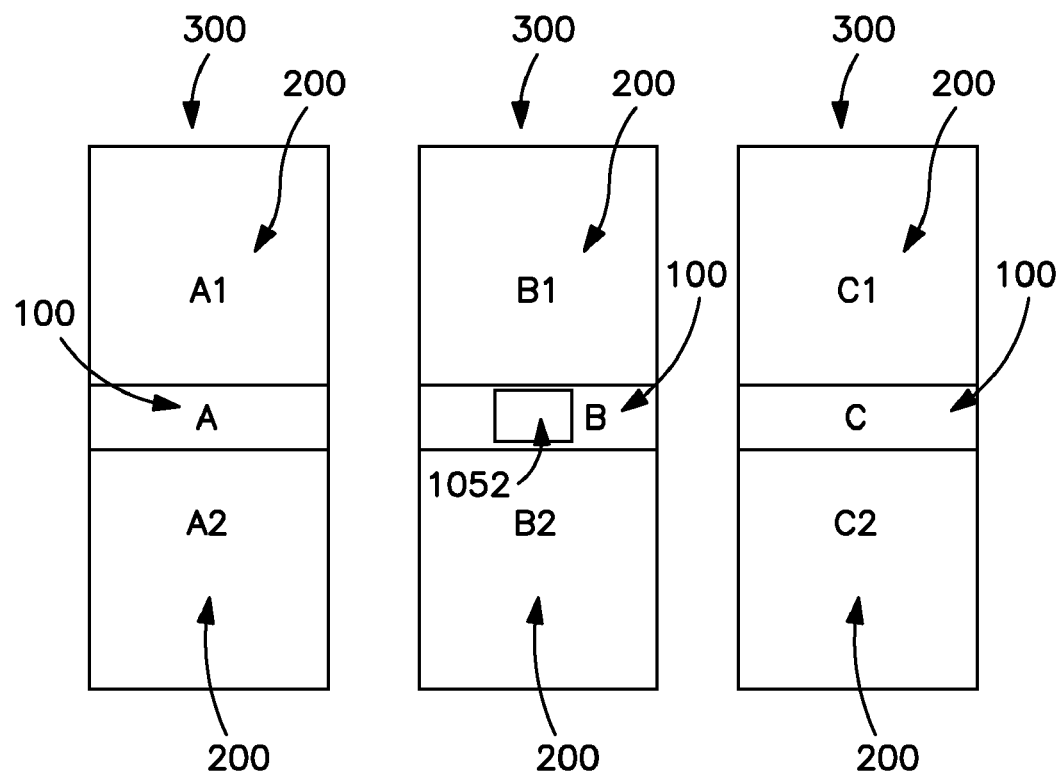
FIG. 12 is a side view showing a system of three RFID scanning towers, two of which are slaves and one of which is a master.

Combining Two Storage Containers and One Apparatus Into a Tower Unit

Where two storage containers 200 (be they, for example, cabinets, freezers, refrigerators, cryo storage, etc.) are connected to one apparatus 100 with the apparatus 100 sandwiched in between, we refer to this combination as a tower unit. This tower will share all the electronic components thus reducing price and maintaining modularity. FIG. 12 shows three tower units 300. The first tower unit 300 comprises a storage container 200 labeled A1 attached to the top of the apparatus 100 labeled A, with another storage container 200 labeled A2 attached to the bottom of the apparatus 100. The second tower unit 300 comprises a storage container 200 labeled B1 attached to the top of the apparatus 100 labeled B, with another storage container 200 labeled B2 attached to the bottom of the apparatus 100. The third tower unit 300 comprises a storage container 200 labeled C1 attached to the top of the apparatus 100 labeled C, with another storage container 200 labeled C2 attached to the bottom of the apparatus 100. In each of these tower units, the RFID reader 102 of the apparatus 100 can be connected to two RFID antennae, one for the top storage container 200 and one for the bottom storage container 200.

The Enclosure's Tray System

Now we will describe a preferred arrangement within apparatus 100's enclosure 101. Inside the enclosure 101, preferably there are two trays. One tray is designed to hold the more stationary items (such as things that have wires running out the back of the apparatus) while the other holds all other components.

Figure 4:
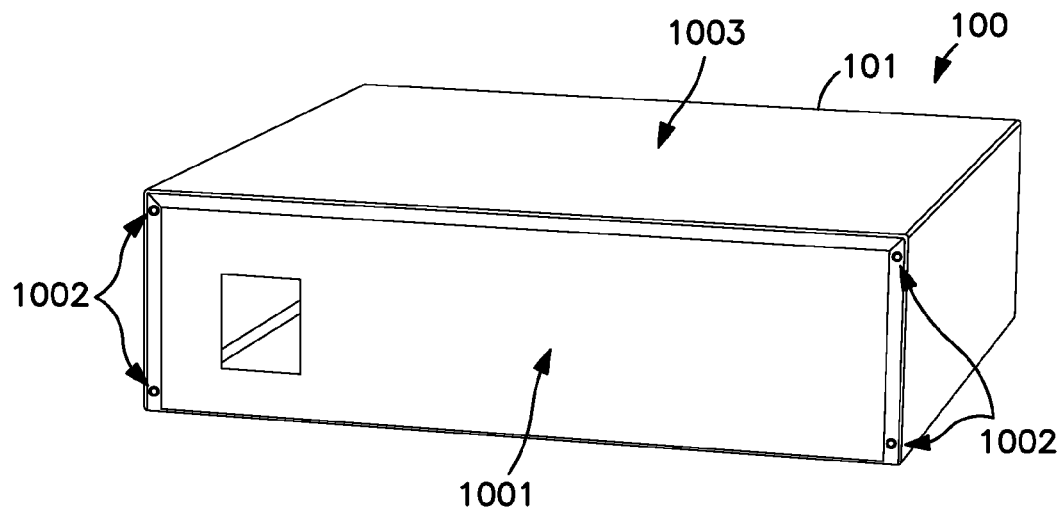
FIG. 4 is a perspective view showing the front and top sides of an enclosure of the RFID apparatus according to an embodiment of the present invention.

Front side 1001 of apparatus 100 comes off when the four screws 1002 are removed in the front, as shown in FIG. 4. This provides access to the electronics.

Figure 5:
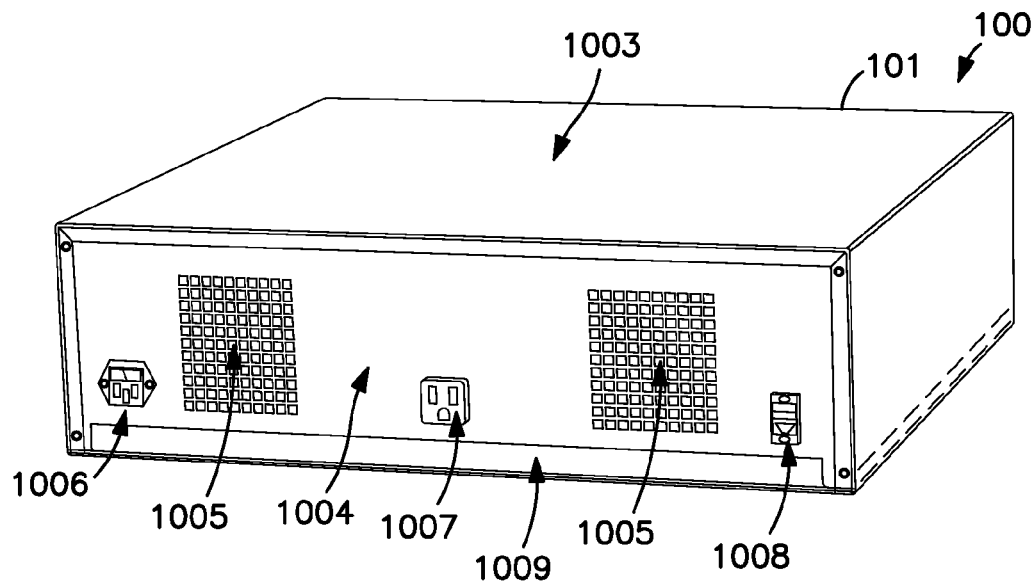
FIG. 5 is a perspective view showing the rear and top sides of the enclosure of the RFID apparatus according to an embodiment of the present invention.

Back side 1004 of the enclosure 101, as shown in FIG. 5, is on hinge 1009. When two screws are removed, this piece (i.e., back side 1004) folds down providing additional access.

The front side 1001 and back side 1004 can be redesigned as necessary to change with hardware. This design does not affect the design of the enclosure 101's chassis, thus reducing the cost and maintaining modularity.

The trays in the apparatus 100 are on the rail mount system 1012. The trays themselves have a din rail mounted to them so that the electronics can be easily mounted. The trays are then able to slide out with the electronics on them so that the parts can be serviced. There will be quick connectors on the appropriate wires so that when a drawer is taken out, the wires are not strained. There will be slack in those wires that a quick connect cannot be used so that removal of a tray does not strain the wires. A multitude of trays can be installed in this configuration by adding the slide rails and appropriate tray to maintain the modular design. If hardware ever needs to be changed in the device, no work has to be done in the chassis itself; only the slidable electronics trays will need a redesign, thus reducing cost.

Other Features of the Enclosure

Figure 11:
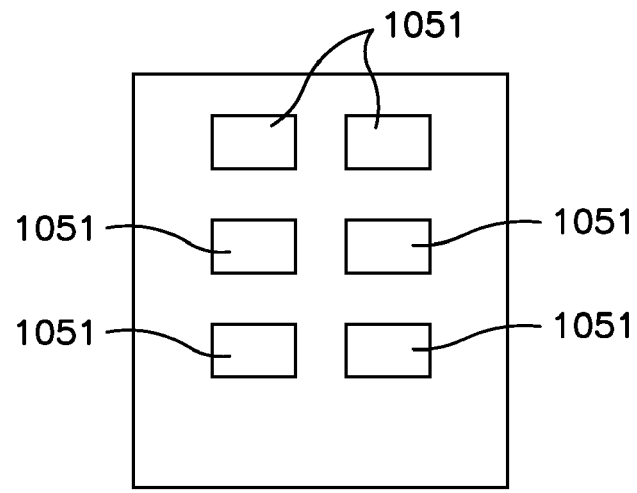
FIG. 11 is a view of a preferred network interface for the enclosure of an embodiment according to the present invention.

Back side (removable service panel) 1004 has several pieces that will be designed into it. They include but are not limited to an IPC power connector 1006, a US style power outlet 1007, at least one Ethernet coupler 1008 (as will be discussed below in more detail, preferably there are at least two Ethernet couplers, and more preferably, even more than two), and a ventilation system with 80 mm fans 1005. Specifically, the US style power outlet should be interchangeable with any outlet style from around the globe. Specifically, the 80 mm fans should have a low noise level (<45 dBm) as well as a low to moderate air flow rating (25-60 cfm). One fan should blow air into the enclosure 101 while the other should blow air out. The fans should be 24V. Specifically, there should be at least one Ethernet coupler to interface with a network (e.g., WAN). Nominally, there should be at least four connectors such as Ethernet couplers—one of which supplies the WAN connection while the other three are to be used to communicate to secondary apparatuses 100 when plural apparatuses 100 are networked together. FIG. 11 shows that, for example, six ethernet connectors 1051 could be provided on the back side 1004 of enclosure 101 to provide connectivity such as that discussed above.

Turning to the two trays (or drawers), the left drawer will hold the RFTD reader 102, the Ethernet hub 104, and a 24V power supply. The right drawer will contain an optional 24V UPS system with battery, an Ethernet based I/O block and any other hardware that may be needed. The controller 103 is mounted to the inside of the front removable panel, preferably.

Now, we will describe the preferred internal wiring in apparatus 100. One feature of our new modular hardware design is a modular scalable bus for all the components to communicate across. To meet this requirement, an Ethernet bus was chosen. Connections using an Ethernet based bus are as follows starting from the controller 103, as shown in FIG. 9.

Preferably, controller 103 has at least two ethernet ports—one for internal communications (e.g., to communicate with RFID reader 102 and ethernet I/O block 110) and one (e.g., a WAN link coupler) for connection to a network such as the internet for reporting back to headquarters (e.g., to a backend inventory management system database 1057). An advantage of providing dual ethernet ports is for network segregation. This protects the end user's network (which would typically be connected to the WAN link coupler) from traffic not bound for their network (i.e., traffic between internal components such as controller 103 and reader 102) and protects the equipment (such as, for example, reader 102) from malicious access. Controller 103 should act as an intermediary that allows access from outside apparatus 100 to internal components (e.g., reader 102) as necessary. Meanwhile, the network attached to apparatus 100's WAN link coupler will not be interrupted or interfered with by apparatus 100's traffic (i.e., traffic between components such as for example, reader 102 and controller 103). Preferably, ethernet hub 104 is an 8-port Ethernet din rail mountable hub and an ethernet cable connects controller 103 to hub 104. Another Ethernet cable connects the hub 104 to the RFID scanner 102 inside the apparatus 100. Another Ethernet cable connects the hub 104 to an Ethernet-based I/O block 110. Currently, the controller 103, ethernet hub 104, and I/O block 110 are being supplied by B&R Automation. Three more Ethernet cables connect to three Ethernet couplers (see item 1051) that are mounted on the back of the apparatus 100. These can then connect to other apparatuses 100 in the nearby vicinity; in other words, plural apparatuses 100 can be networked together. We will discuss this in detail below.

Figure 9:
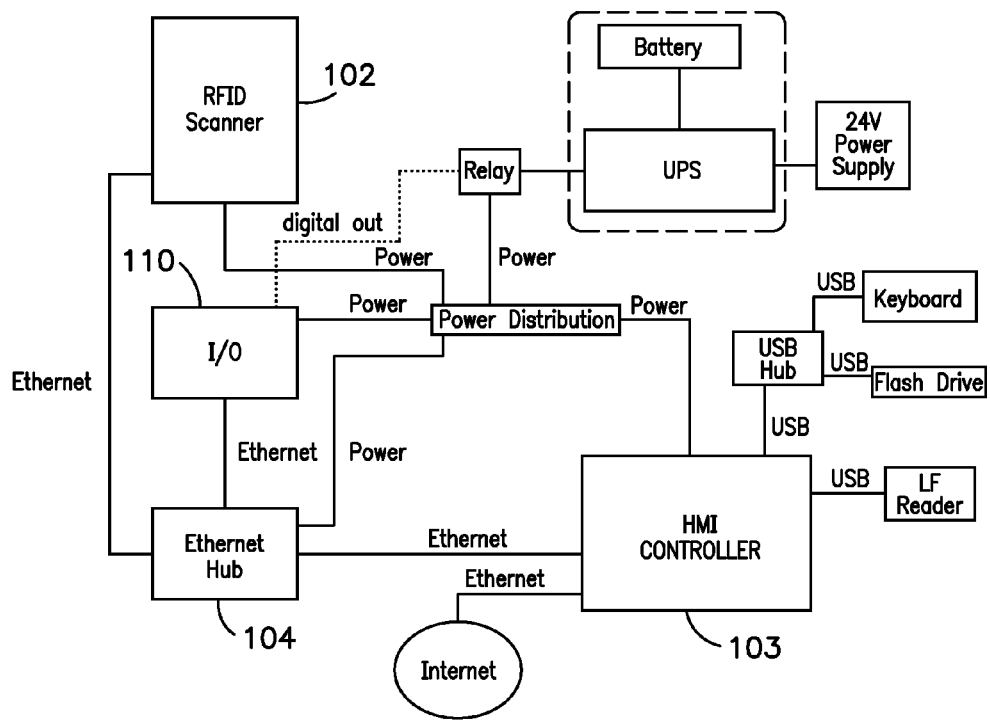
FIG. 9 is a schematic diagram showing a preferred circuit arrangement for the RFID apparatus according to an embodiment of the present invention.

Before doing so, however, we will continue our description of the FIG. 9 circuit arrangement. Preferably, incoming 120/240 VAC power will connect through the switched IPC connector. Inside, this power will be split. One lead will run to a set of at least two outlets (these can be customized per country the system will be placed in) while the other will lead to a power supply. The output of the power supply is 24V DC @ a minimum of 7 amperes. This output has 3 possible options: (a) the power goes directly into a master relay that provides a hard reset capability; (b) the power goes into a battery charging system similar to the design of the current system then leading to a master relay that provides a hard reset capability; and (c) the power goes into a UPS system that controls the battery, charging and error reporting in relation to power. Power out of the UPS connects to a master relay that provides a hard reset capability.

The master relay has a control line that flows from the local I/O block 110. Out from the master relay, power will be moved to a distribution block. This can then be pushed out to the controller 103, I/O block 110, Ethernet hub 104, and RFID scanner 102 as the primary power consumers. Any other devices requiring power can also be supplied power in this manner.

The controller 103 at present has at least two USB ports. This acts as a primary (or secondary) interface into the controller 103 in case it is malfunctioning in some way. The access control method will connect into one of these ports—it may be a passkey (operating at 125 KHz), a pin key (for those that do not have an HMI/controller 103 with a touch screen), a magnetic strip reader, or a biometric reader (retina, fingerprint, DNA, etc.), for example. The other USB port will not be available externally. A USB hub can be hooked up to either port on the controller 103 to expand USB usage. A keyboard, mouse, and flash drive could then be used in the troubleshooting process or software update process. This also provides expandability for future devices to connect to the controller 103.

There is one serial port on the controller 103 at present. As serial is an older technology, it is becoming harder to find and support devices that use a serial connection. However, we will provide the port as a means of connecting some external peripheral. This port can also be used as a means to interface with any legacy hardware that may want to be included.

Networking Plural Apparatuses Together

Figure 10:
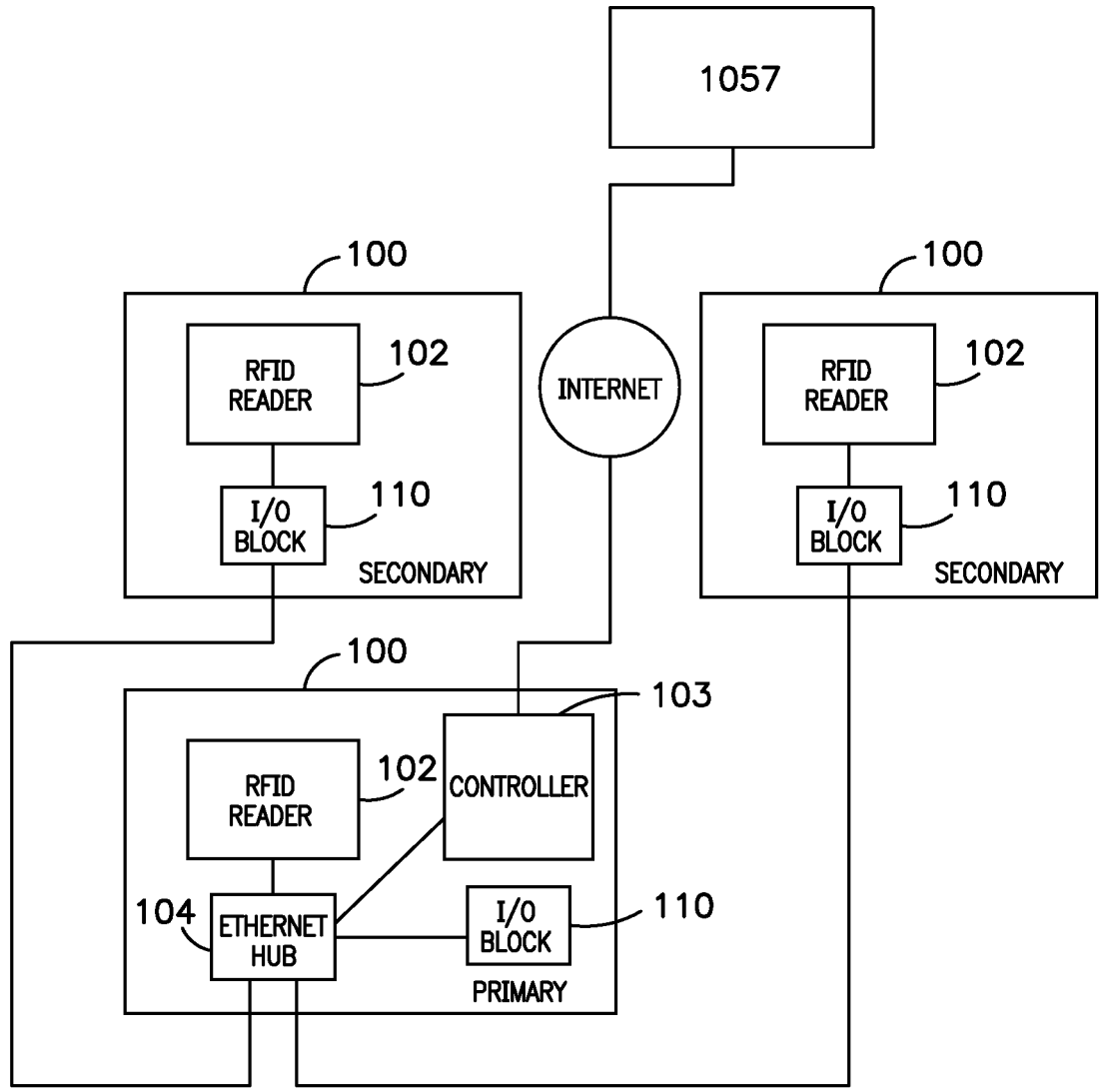
FIG. 10 is a schematic diagram showing a system of three RFID scanning apparatuses, one of which has a controller.

As mentioned above, plural apparatuses 100 can be networked together. We will now describe a preferred arrangement of such a network system, with reference to FIG. 10. That figure shows three apparatuses 100 networked together via ethernet connections. One of the apparatuses 100 is considered to be the primary apparatus, while all other apparatuses 100 that connect to the primary apparatus 100 are secondary and connect via Ethernet. The primary apparatus 100 is one that has the controller 103 in it. Preferably, primary apparatus 100 also includes ethernet hub 104 which connects to the RFID reader 102 and controller 103 in primary apparatus 100, as well as to the RFID readers 102 in each of the two secondary apparatuses. The secondary apparatuses 100 preferably do not have a controller 103 in them. There is also no Ethernet hub 104 inside the secondary apparatuses 100, although this does not mean one cannot be included. Instead, I/O block 110 is used as an ethernet hub. In the FIG. 10 arrangement, the controller 103 controls the RFID reader 102 that is in the primary apparatus 100 in which the controller 103 is located, as well as the RFID readers 102 that are in each of the secondary apparatuses 100. Such control includes, as discussed above, generating commands to instruct the RFID reader 102 to initiate a scan, obtaining a list of tags read from the RFID reader, and determining a difference between that list and an earlier list to determine a change in inventory.

More Details of Controller 103

Preferably, the I/O block 110 in FIG. 9 has a two port Ethernet hub built into it. An Ethernet line coming from the primary apparatus 100 would connect into a coupler on the secondary apparatus 100 and then connect to the I/O block 110. The second I/O Ethernet port on the I/O block 110 would then be used to connect to the RFID scanner (i.e., RFID reader 102) inside the secondary apparatus.

Preferably, controller 103's software program (i.e., the Application Program) shall be a multi-threaded program allowing access to one storage container 200 connected to one apparatus 100 in a network while another storage container 200 is being scanned by its RFID reader 102. This RFID reader 102 can be in a master or secondary apparatus 100. Therefore if a user has accessed one storage container 200, and that container is being RFID scanned, another user can immediately come up to the same apparatus 100 where the controller 103 is located, present a pass to authenticate himself or herself, and then gain access to another container 200 provided that container 200 is not actively being RFID scanned at the time of access. If the user tries to gain access to any container 200 while it is being scanned, a please wait message would be displayed.

The Application Program Flow Control

We will now provide a more detailed discussion of the preferred flow control of the Application Program's software program code with reference to the drawings. Of course, this flow control represents a preferred embodiment, and our invention is not so limited.

Figure 16:
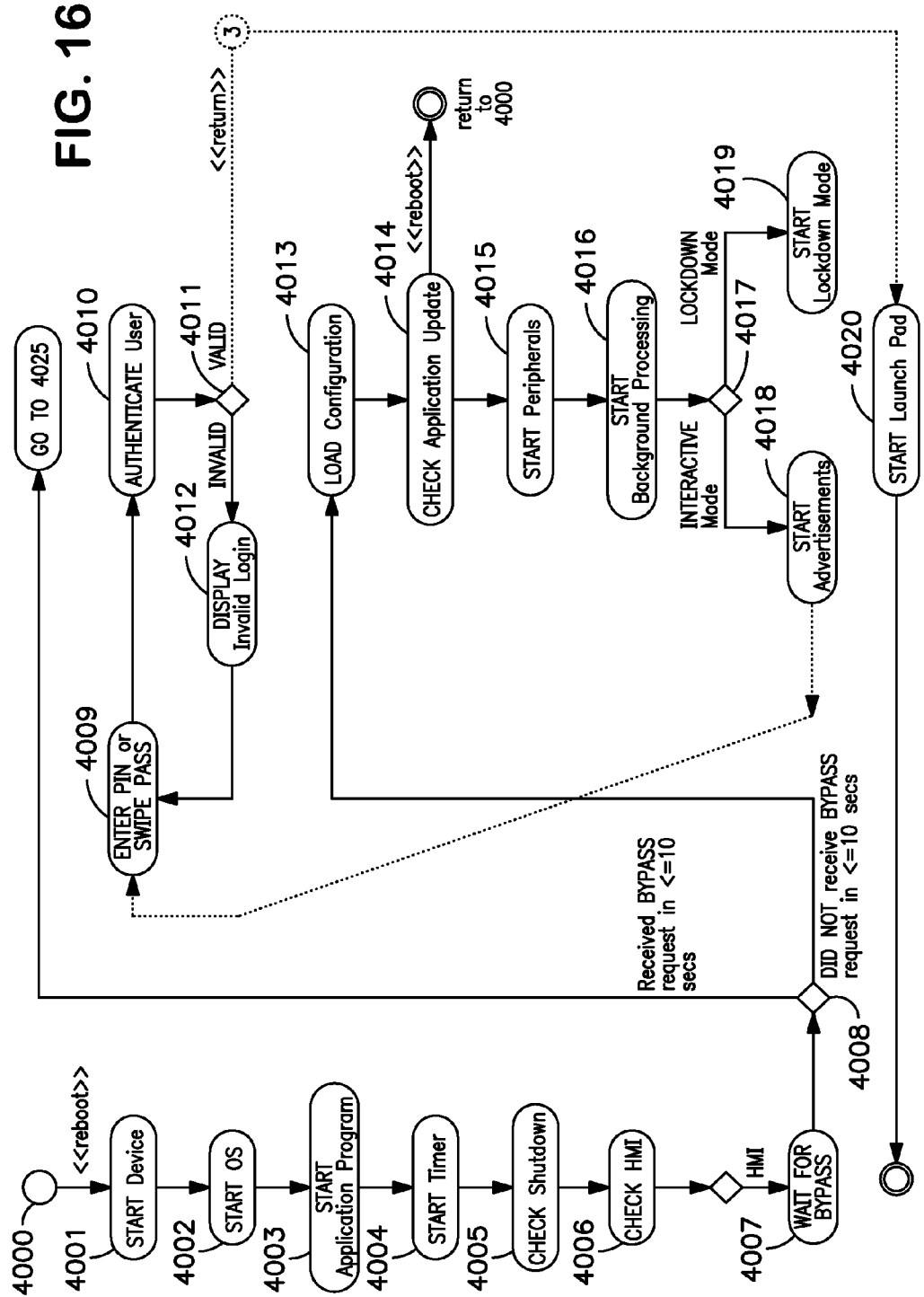
FIG. 16 is a flowchart showing operation of the software of the apparatus where a human-machine interface is available, in a normal mode.
Figure 17:
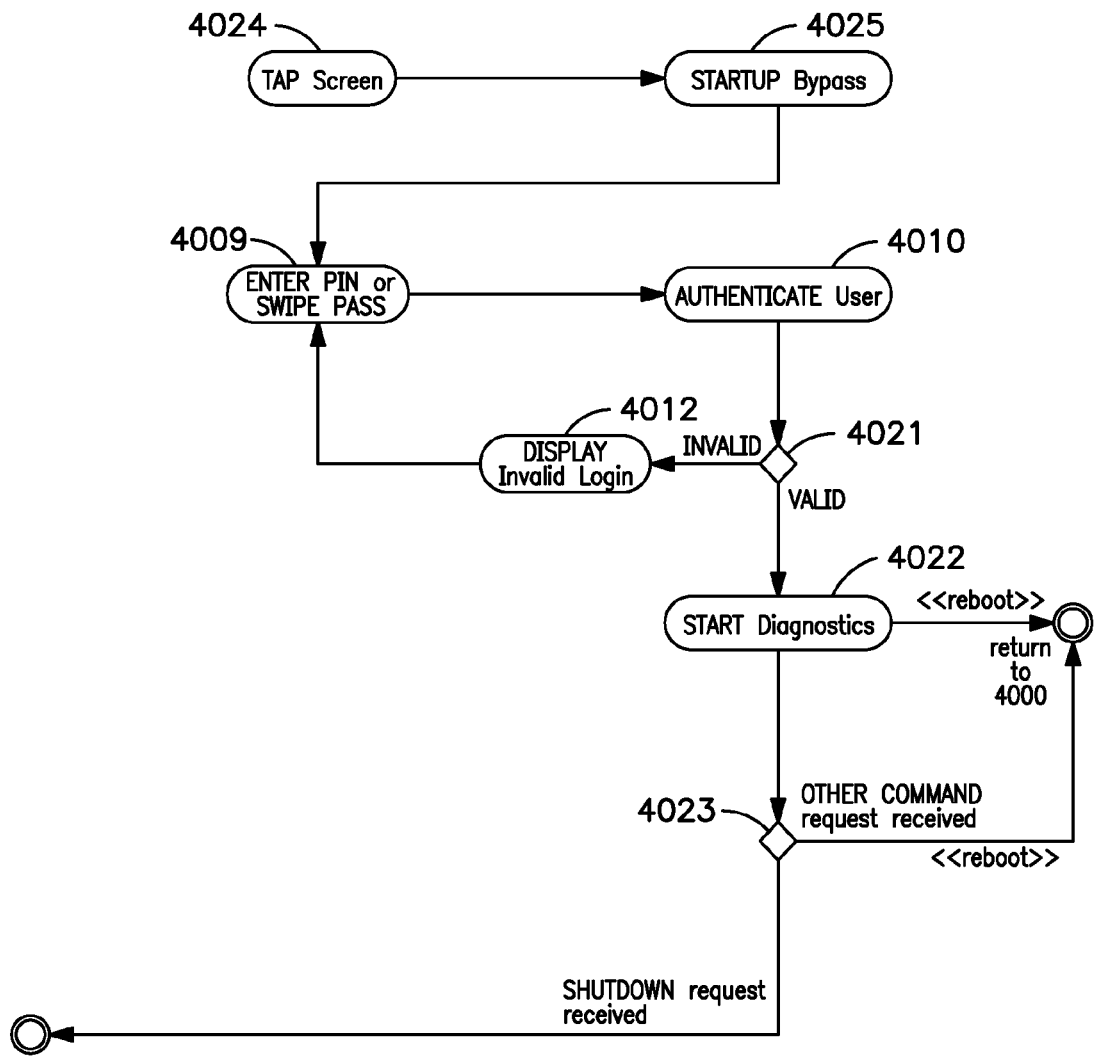
FIG. 17 is a flowchart showing operation of the software of the apparatus where a human-machine interface is available, but the normal mode is bypassed.
Figure 18:
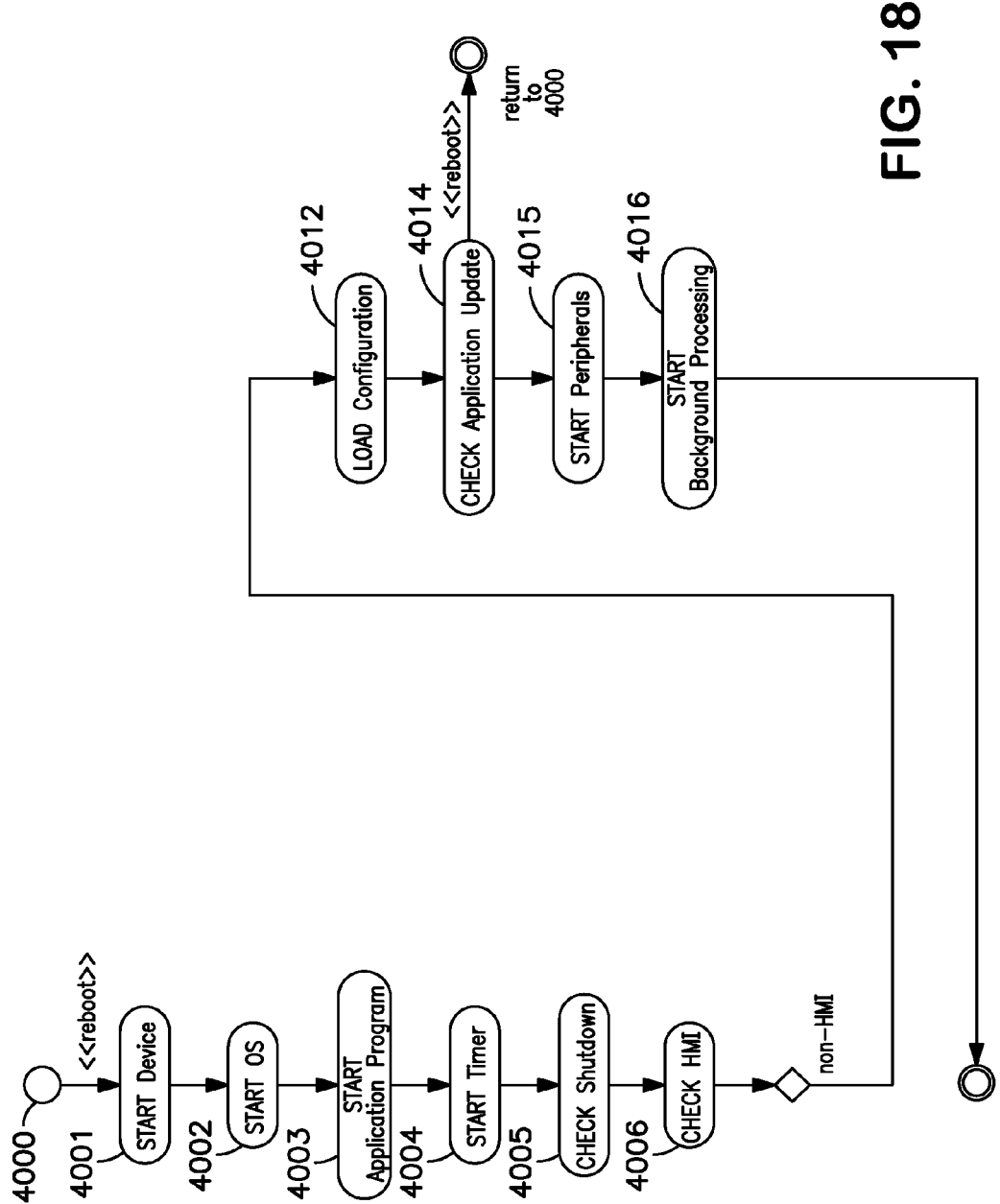
FIG. 18 is a flowchart showing operation of the software of the apparatus in an apparatus where no human-machine interface is available.

FIG. 16 shows operation of the apparatus 100 and its Application Program in a case where a human-machine interface (HMI) is available; FIG. 17 shows operation in a case where a HMI is available, but a user bypasses normal operation to administer the apparatus; and FIG. 18 shows operation in a case where an HMI is not available.

Turning to FIG. 16 in more detail, step 4000 represents the starting point of the flow control.

At step 4001, controller 103 powers up or reboots.

At step 4002, the operating system (OS) of controller 103 is started. For example, where the OS is Windows CE, controller 103 boots into Windows CE.

At step 4003, the Application Program is started. Unless otherwise specified, the remaining steps discussed represent flow control in the Application Program. The Application Program shall store an information transaction to indicate that the Application Program has begun the startup sequence.

At step 4004, the Application Program starts the Hardware Watchdog Timer. The Application Program should ping the Watchdog continuously otherwise the device will reboot.

At step 4005, the Application Program shall check to see if the Application Program was properly shutdown. The Application Program shall store an error transaction, if the Application Program was not properly shutdown. The Application Program shall also clear a flag (indicating shutdown status).

At step 4006, the Application Program will check to see if a human-machine interface (HMI) is present. The Application Program shall prevent denial-of-service (DoS) attacks against the unit (by letting a user continually try to bypass the sequence). The Application Program shall provide this functionality as early in the process as possible to minimize a problem from occurring that would prevent access to the diagnostics.

If it is determined at step 4006 that an HMI (e.g., touch screen display) is available for apparatus 100, then at step 4007, the Application Program shall wait for bypass.

In more detail, the Application Program shall display a screen with the prompt, "Tap screen to bypass startup sequence". This screen shall allow the user the opportunity to interrupt the startup sequence for testing, diagnostics, tech support, etc.

If in step 4008 it is determined that the user has tapped the screen to bypass the startup sequence within a predetermined amount of time (e.g., less than or equal to ten seconds), then flow control passes to step 4025 in FIG. 17, as discussed below.

If, on the other hand, it is determined in step 4008 that the user does not tap the screen to bypass the startup sequence within the predetermined amount of time, then flow control passes to step 4013.

At step 4013, the Application Program loads communication configuration settings from a database so that the apparatus 100 can configure itself for communication.

At step 4014, the Application Program will connect to the backend system and send all currently stored transactions (e.g., records showing that a certain user has taken a certain tag or tags from a certain storage container) that have not been sent.

This step will also allow the unit to receive any updates (e.g., software updates) from the backend system. If so directed by the backend system, the Application Program will run an application update routine to update software such as the Application Program. The Application Program should reboot after the application update, and thus return to step 4000.

At step 4015, the Application Program will start peripherals. In more detail, it shall initialize the RF reader 102, the transponder, and the I/O block 110. The Application Program shall connect to and initialize devices such as these based on the loaded configuration parameters. Preferably, the Application Program shall proceed as follows in this regard: (1) using reflection, create an instance of each required device library; (2) add device instance to device manager, verify that all devices successfully replied to ping command; and (3) engage locking mechanism.

At step 4016, the Application Program starts background processing (BP). In BP, the Application Program shall perform a standard diagnostic check, and the following additional diagnostics: (1) check door status and (2) perform a base inventory scan if the door is closed.

At step 4017, the Application Program shall then analyze diagnostics to determine if the unit should go into Interactive or Lockdown mode.

The following is a list of conditions considered in step 4017 which could cause the apparatus 100 to enter into Lockdown mode in step 4019:

(1) the Application Program shall enter Lockdown mode, if the interior temperature falls outside of specified range (as defined in the configuration);

(2) the Application Program shall enter Lockdown mode, if a request has come in from the web service to enter this mode;

(3) the Application Program shall compare the results of the base inventory scans with the last known scan and enter Lockdown mode if more then X number of products have been removed (X shall be a configuration parameter);

(4) the Application Program shall enter Lockdown mode if there is no more space to store transactions (the application shall need enough storage space left to store an info-transaction to indicate lockdown);

(5) the Application Program shall enter Lockdown mode if the door was open when the unit was turned on.

Preferably, the Application Program needs to continue starting up and enter the interactive mode, so that the apparatus 100 can support multiple units (i.e., to support a configuration where one apparatus 100 handles multiple storage containers). In other words, if there are six storage containers, and one is open and five are closed, the apparatus 100 should not lockdown the five that are closed. Instead, the Application Program sends an information transaction to the backend system to indicate that the Application Program started up with the door open. Once the door is closed, the Application Program performs a baseline inventory scan (i.e., controls the RFID reader 102 to initiate RFID scanning to obtain a baseline inventory scan).

At the end of step 4017, the Application Program shall send (e.g., to the backend system) a diagnostics message, such as a message indicating that the unit has completed its startup sequence and is entering either Interactive or Lockdown mode. The Application Program shall also send (as part of the same message) the results of the diagnostics.

In step 4019, Lockdown Mode is carried out. The Application Program shall send a message to the web service (i.e., the backend system) that unit is in Lockdown mode. The Application Program shall show advertisements as normal, and shall provide a screen display indicating that the device is in Lockdown mode. The Application Program shall restrict the user from opening the door, unless the user authenticates to the full administrator role (i.e., authenticates himself as an administrator). The Application Program shall continue to send heartbeats at configured intervals as part of the background processing. The Application Program shall remain in Lockdown mode until the receipt of a Cancel Lockdown mode message from the web service (i.e., backend system).

In step 4018, the Interactive Mode is initiated. If an HMI is present, the Application Program will start displaying advertisements to the user on the display screen, and shall wait for the user to authenticate.

In more detail, flow control will now pass to step 4009. At step 4009, the Application Program shall wait for a user to present a pass or credentials (e.g., PIN, biometrics, RFID badge, magnetic card, etc.) to authenticate himself. This allows the Application Program to check for an authorized user; the Application Program determines if the user has presented valid credentials.

At step 4010, the user is authenticated by the Application Program based on the pass presented.

At step 4011, the Application Program determines if the user's credentials are valid or not. If the user's credentials are invalid, then flow control passes to step 4012.

At step 4012, the Application Program uses the HMI's display to inform the user that the user of his invalid login, and flow control returns to step 4009.

If the user's credentials are found in step 4011 to be valid, the flow control passes to step 4020. In this step, the Application Program enters a main processing loop that we refer to as the LaunchPad. In particular, preferably, the Application Program shall display a screen on the HMI in response to the user being authenticated. The screen shall include the following information: (1) welcome message with the user's first name; (2) a transaction confirmation screen; (3) an elevate permissions button—elevated permissions is the process of temporarily granting a user who is not a member of the full administrator role, full administration rights, after the completion of a challenge/response process (the duration of the elevated permission shall last until the user logs out); (4) a button for each storage container controlled by the Application Program (clicking the button will unlock that storage container); and (5) for limited and full administrator logins only, (a) an inventory restock button; (b) a maintenance button; and (c) a diagnostics button. In this LaunchPad mode, after the storage container or storage containers are unlocked, the user will be able to remove one or more tags or tagged items from the same or to add a tag or tagged item or items. After a storage container is locked, Application Program will generate a command for initiating RFID reading and communicate that command to the RFID reader responsible for that storage container.

If it is determined at step 4008 that the user has requested bypass (e.g., by tapping the screen within 10 or less seconds), then flow control continues with step 4025 in FIG. 17. In this figure, steps 4009, 4010, and 4012 are similar to those described above with respect to FIG. 16. Thus, the user will now need to authenticate himself. If the user is not authorized to bypass the startup sequence, then in step 4012, the Application Program shall display a screen with a message that reads, "You do not have access to bypass startup sequence" for 2 seconds indicating failure, and then continue the boot process, if the user presents invalid credentials or after 3 invalid attempts or 10 seconds have expired. If it is determined in step 4021 that the credentials are valid, then flow control continues to step 4022. In that step, a diagnostics screen is displayed to the user, along with an option to load the configuration settings (here, the user can administer apparatus 100 by performing diagnostics or changing the configuration settings). In step 4023, it is determined whether to shutdown the apparatus 100 or to reboot it.

FIG. 18 shows the flow control where it is determined that an HMI is not available. This is similar to FIG. 16, but since there is no display, there is no advertising. When background processing is started in step 4016, the apparatus 100 is in a state where it is ready to unlock a storage container and, in response to closing of the door of the storage container, to perform RFID scanning as discussed above.

Of course, the foregoing represents the preferred flow control used by the Application Program, and is provided by way of example and not of limitation.

A Network of Tower Units

Another network system is shown in FIG. 12. In that figure, there are three tower units 300, as discussed above. The middle tower unit 300 is a master tower that houses the controller 103 (and HMI), whereas the left and right tower units 300 are secondary towers that do not have controllers 103. The secondary towers connect to the master tower 300's controller 103 via ethernet so that controller 103 may control the RFID readers 102 of the two secondary towers. This enables the placement of several towers with the possibility of any storage type to be located in close proximity. This maintains the modular approach of mixing and matching the required storage while reducing the cost of hardware.

Additional or Alternative Embodiments or Modifications of Embodiments

While the invention has been discussed above with respect to a storage container, it is envisioned that the invention could also be applied to other areas intended to be RFID-scanned, such as, for example, an open-face shelf. In such a case, the enclosure 101 could be attached to the shelf. And RFID antenna 106 could be mounted on or in a shelf.

Another embodiment is an application of the invention for museum use or the like. For example, a system could be set up where personnel have limited access or registered access to a room or an area. Access would be provided in accordance with an RFID pass, biometric scan, or magnetic card swipe, for example. Any movement or removal of tagged objects or artifacts in the room would be registered (i.e., charged) to that individual person, thus allowing check-in and check-out of objects/artifacts from the room or area. Preferably, wiring connecting the apparatus 100 to the RFID antenna 106 would not be visible or externally accessible. The antenna or antennae 106 could be placed on a shelf or shelves external to the apparatus 100.

Figure 15:
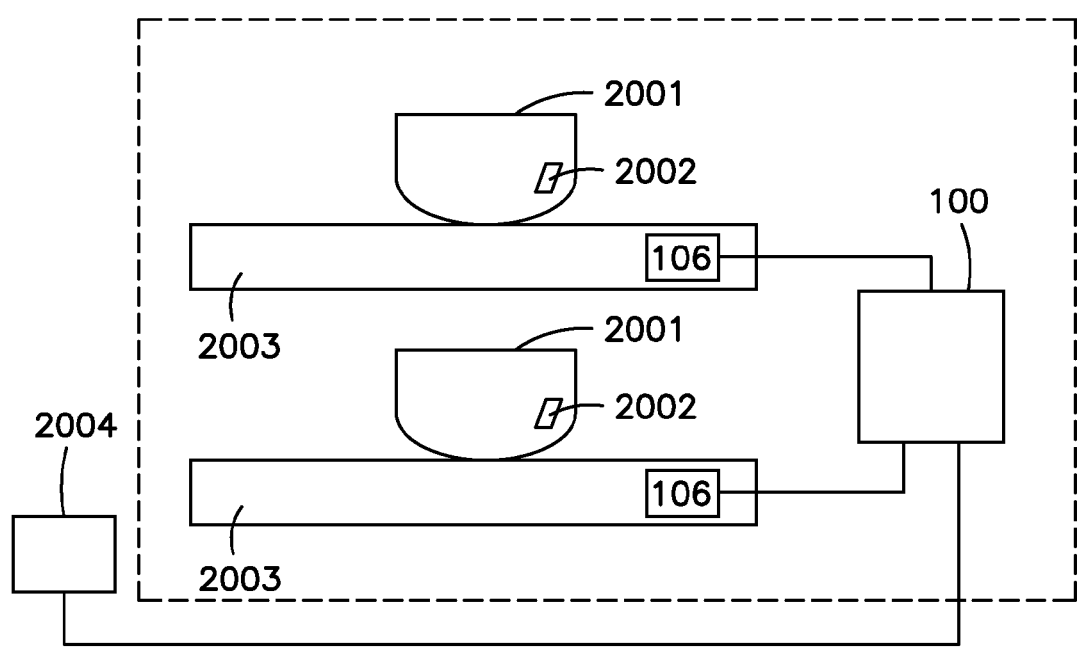
FIG. 15 is a schematic view showing a multi-antenna RFID apparatus according to the present invention for scanning two shelves in a museum to check for tagged objects or artifacts.

This alternate embodiment is schematically depicted in FIG. 15. In that figure, reference numeral 2001 indicates two artifacts or objects, each having an RFID tag 2002, which are respectively placed on a pair of open shelves 2003, each shelf having an RFID antenna 106. Apparatus 100 uses the two RFID antennae 106 to detect the presence or absence of the tagged artifacts or objects. Reference numeral 2004 denotes an authentication unit, connected to apparatus 100, that authenticates a user using a pass such as an RFID pass or magnetic card or the like or by using biometrics, and permits access to a room (indicated by the dotted line) in which the artifacts or objects are located.

INDUSTRIAL APPLICABILITY

The present invention provides an RFID reader with an enclosure that allows it be securely affixed to a storage container such as a refrigerator without exposing wiring to tampering, and thus has use as an improved mounting technique.

The present invention also provides an RFID reader that uses plural antennae to scan plural respective storage containers, thereby avoiding the need to have plural RFID readers, and thus has use as an improved RFID scanning technique.

And the present invention also provides a networked system of master and slave RFID apparatuses, wherein a master RFID apparatus contains a controller for controlling the slave RFID apparatuses which lack such a controller, and thus has use as an improved RFID scanning system.

CONCLUSION

Except as otherwise disclosed herein, the various components shown in outline or in block form in the figures are individually well known and their internal construction and operation are not critical either to the making or using of this invention or to a description of the best mode of the invention.

Although specific embodiments of the present invention have been described above in detail, it will be understood that this description is merely for purposes of illustration. When we have said that something "is", "shall", "will", or "should be" the case, for example, we do not mean to limit the invention, but are merely providing a specific example or specific examples. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A storage system comprising:
   a storage container having a plurality of walls;
   an RFID antenna coupled to the storage container and sending RF signals to at least one RFID tag within the storage container;
   an RFID reader interfacing with the RFID antenna to send RF signals and process responses received back from the at least one RFID tag;
   a human-machine interface for control of the RFID reader, the human-machine interface authenticating a user seeking access to the storage container and including a display screen to display an advertisement targeted to the user.

2. The storage system of claim 1, wherein the storage container includes a lockable door, and wherein the human-machine interface sends a signal to unlock the door of the storage container in response to authenticating the user.

3. The storage system of claim 2, wherein the human-machine interface instructs the RFID reader to perform an RFID scan in response to a user closing the door and calculates a difference between an RFID scan result returned by the RFID reader and an earlier RFID scan result returned by the RFID reader to determine if any RFID tags have been removed from or added to the storage compartment.

4. The storage system of claim 3, wherein the earlier RFID scan result is obtained before the door is opened.

5. The storage system of claim 1, wherein the human-machine interface is coupled to the storage container.

6. The storage system of claim 1, wherein the human-machine interface is remotely disposed from the storage container.

7. The storage system of claim 1, wherein the display screen includes an LCD touchscreen.

8. The storage system of claim 1, wherein the advertisement is targeted to the user based upon a user transaction history.

9. The storage system of claim 8, wherein the advertisement is targeted to the user further based upon a sales promotion.

10. The storage system of claim 1, wherein the advertisement is targeted to the user based upon a purchase request.

11. The storage system of claim 1, wherein the human machine interface further displays a non-targeted advertisement between periods of use.

12. A method of operating a storage system that includes a cabinet having a plurality of walls and a door surrounding an interior cavity, an RFID antenna coupled to the cabinet, an RFID reader operably connected to the RFID antenna, and a human-machine interface configured for user control of the RFID reader, the method comprising:
    providing at least one item within the interior cavity, the at least one item including an RFID tag;
    entering a user identifier via the human-machine interface;
    entering a user request, via the human-machine interface, for the at least one item;
    scanning the RFID tag with the RFID reader; and
    displaying an advertisement on a display screen of the human machine interface.

13. The method of claim 12, further comprising targeting the advertisement to the user based on the user identification.

14. The method of claim 13, further comprising targeting the advertisement to the user based further on a current user request.

15. The method of claim 13, further comprising targeting the advertisement to the user based further on a past user request.

16. The method of claim 12, further comprising communicating an RFID scanning result to an inventory database.

17. The method of claim 12, further comprising
    instructing the RFID reader, via the human-machine interface, to perform an RFID scan in response to a user closing the door;
    calculating a difference between an RFID scan result returned by the RFID reader and an earlier RFID scan result returned by the RFID reader; and
    determining if any RFID tags have been removed from or added to the storage compartment.

18. A storage system comprising:
    a plurality of storage towers, each storage tower including a discrete housing;
        a first cabinet having a plurality of walls and a door surrounding a first interior cavity;
        a compartment disposed adjacent a wall of the first cabinet; and
        a first antenna disposed within the first cabinet and operable to scan RFID tags stored within the first interior cavity;
    a first RFID reader disposed within the compartment of a first storage tower of the plurality of storage towers, the first RFID reader configured to perform RFID reading via the first antenna of at least the first storage tower;
    a second RFID reader disposed within the compartment of a second storage tower of the plurality of storage towers, the second RFID reader operable to perform RFID reading via the first antenna of at least the second storage tower; and
    a human-machine interface for receiving a user request and for user control of the first RFID reader and the second RFID, the human-machine interface including a display screen and operable to display an advertisement targeted to the user.

19. The storage system of claim 18, wherein the human-machine interface further communicates via a network connection with an inventory management system.

20. The storage system of claim 19, wherein said human-machine interface controls said first RFID reader to perform plural RFID scans, obtains a first RFID scanning result in accordance with the plural RFID scans by said first RFID reader, control said second RFID reader to perform plural RFID scans, obtains a second RFID scanning result in accordance with the plural scans by said second RFID reader, and communicates with the inventory management system in accordance with the first RFID scanning result and the second RFID scanning result.

* * * * *